United States Patent [19]
Hershberger

[11] 4,434,546
[45] Mar. 6, 1984

[54] METHOD OF MAKING A CORE

[75] Inventor: Doran D. Hershberger, Sycamore, Ill.

[73] Assignee: General Electric Company, Fort Wayne, Ind.

[21] Appl. No.: 304,536

[22] Filed: Sep. 22, 1981

Related U.S. Application Data

[62] Division of Ser. No. 77,784, Sep. 21, 1979, Pat. No. 4,327,302.

[51] Int. Cl.³ .................................................. H02K 15/02
[52] U.S. Cl. ............................................. 29/598; 29/418; 310/156; 310/216
[58] Field of Search ................. 29/598, 418; 310/156, 310/211, 212, 181-184, 162-165, 216

[56] References Cited

U.S. PATENT DOCUMENTS

| | | |
|---|---|---|
| 2,062,938 | 12/1936 | Ruppe . |
| 3,216,226 | 11/1965 | Alger et al. ........................... 68/23 |
| 3,427,486 | 2/1969 | Whitney ............................ 310/180 |
| 3,567,974 | 3/1971 | Spingler ............................. 310/46 |
| 3,840,763 | 10/1974 | Baumann et al. ................. 310/156 |
| 3,979,821 | 9/1976 | Noodleman ......................... 29/598 |
| 4,005,347 | 1/1977 | Erdman ............................. 318/254 |
| 4,188,554 | 2/1980 | Binns ................................. 310/156 |
| 4,232,536 | 11/1980 | Koseki et al. ....................... 68/12 R |

FOREIGN PATENT DOCUMENTS

| | | |
|---|---|---|
| 2608421 | 1/1976 | Fed. Rep. of Germany . |
| 2324150 | 8/1977 | France . |
| 964046 | 7/1964 | United Kingdom . |
| 1177247 | 1/1970 | United Kingdom . |
| 1270807 | 4/1972 | United Kingdom . |
| 1324147 | 7/1973 | United Kingdom . |
| 1359548 | 7/1974 | United Kingdom . |
| 1422522 | 1/1976 | United Kingdom . |
| 1552694 | 9/1979 | United Kingdom . |

Primary Examiner—Carl E. Hall
Attorney, Agent, or Firm—Joseph E. Papin

[57] ABSTRACT

A method of making a core adapted to be used in a dynamoelectric machine. The core has a plurality of slots extending therethrough defining a plurality of first pole sections interposed between adjacent ones of a plurality of integrally interconnected second pole sections, respectively. In this method, a plurality of sets of magnetic material elements are located within the slots generally between the first pole sections and the adjacent ones of the second pole sections, respectively, and a nonmagnetic hardenable material is provided at least within the slots so as to at least in part fill the interstices of the slots generally about the magnetic material element sets in the slots, respectively.

35 Claims, 33 Drawing Figures

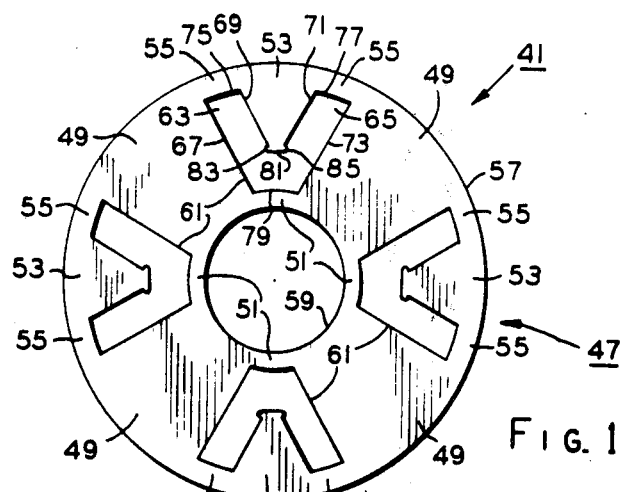

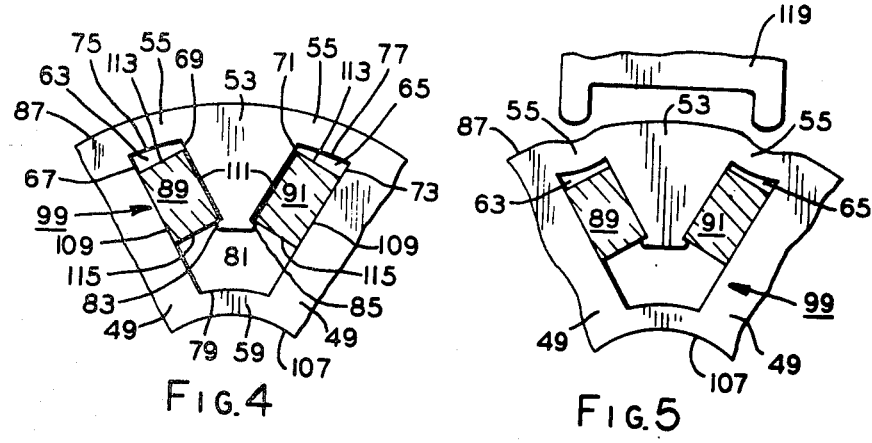
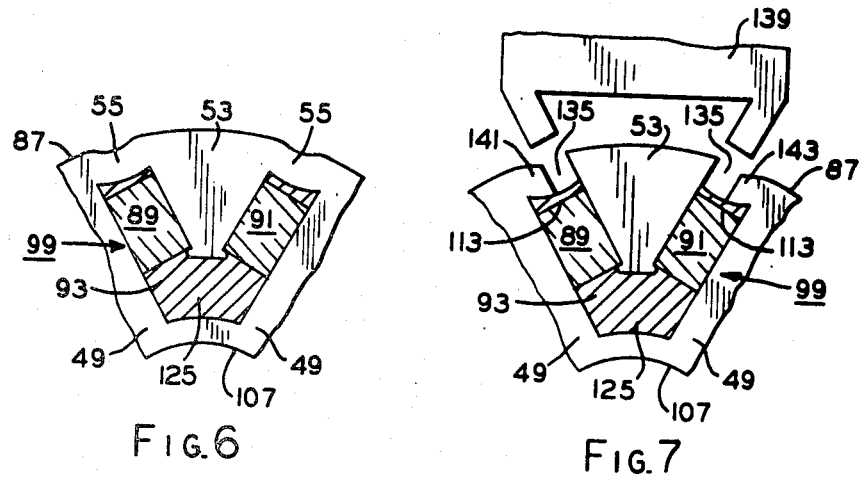
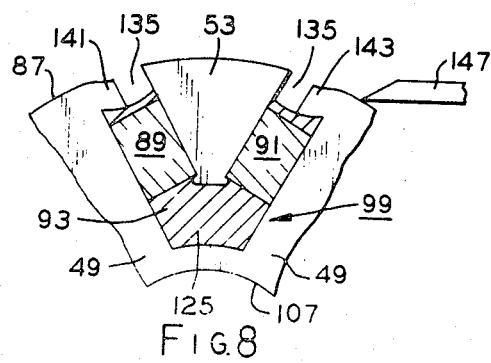

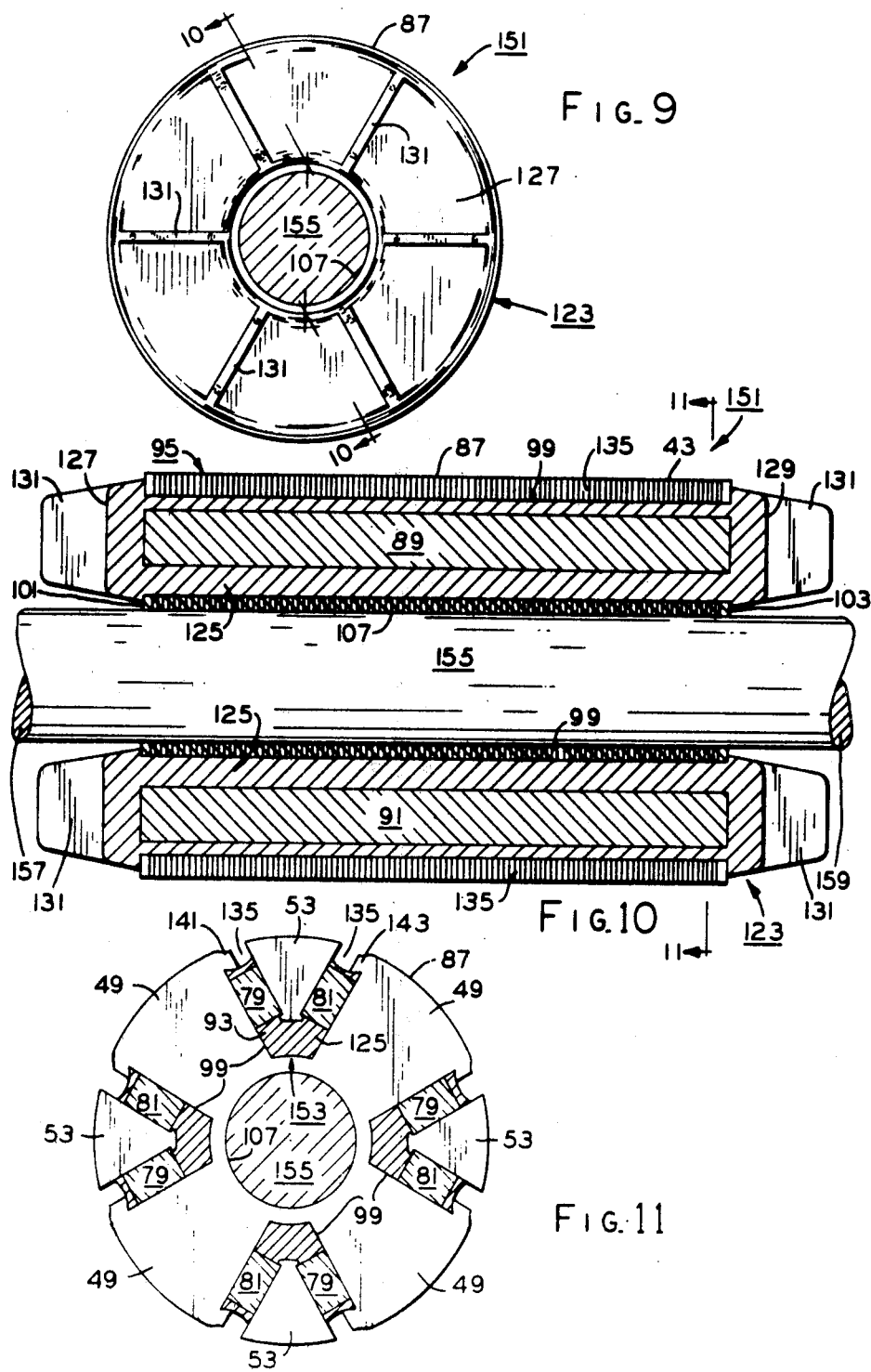

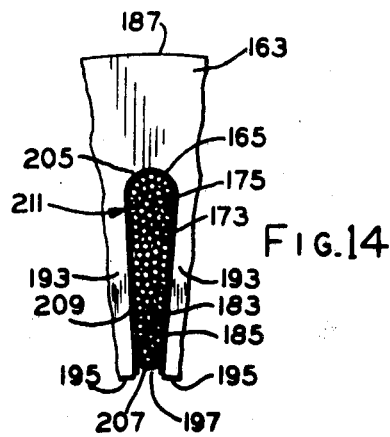
FIG.14
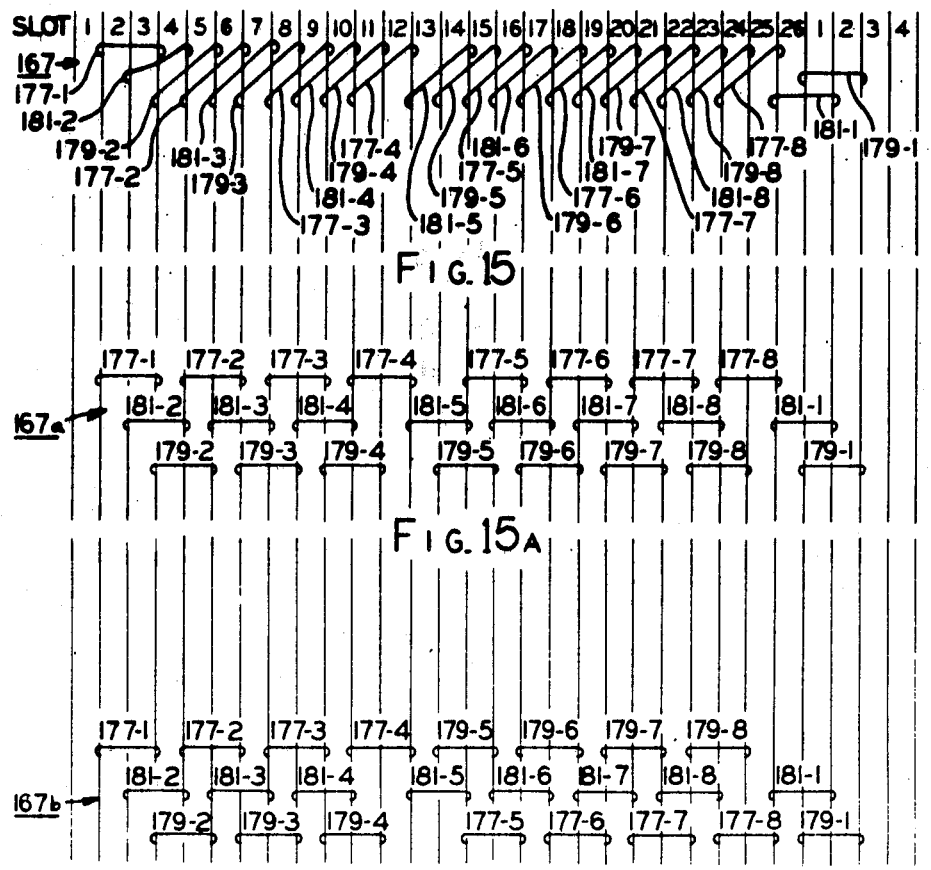
FIG.15
FIG.15A
FIG.15B

METHOD OF MAKING A CORE

CROSS-REFERENCE TO RELATED APPLICATION

This application is a division of application Ser. No. 077,784 filed Sept. 21, 1979 (now U.S. Pat. No. 4,327,302 issued Apr. 27, 1982) which is incorporated herein by reference.

FIELD OF THE INVENTION

This invention relates in general to dynamoelectric machines and in particular to a method of making a core.

BACKGROUND OF THE INVENTION

In the past conventional DC motors, commutation was effected by brushes riding on a segmented commutator so as to control the currents flowing through the armature winding sections of such past conventional DC motors. Of course, one of the disadvantageous or undesirable features attendent to the above discussed commutated DC motors is believed to be that wear of the brushes thereof necessitated frequent brush replacement. Other disadvantageous features of these past commutated DC motors are belived to be that sparking may have occurred between the brushes and segmented commutator thereof which not only may have effected RF interference but also may have limited the use of such commutated DC motors in some critical or particular environmental applications.

Various circuit and motor design schemes have been utilized in the past to develop various types of brushless DC motors, and one such scheme is shown in the David M. Erdman U.S. Pat. No. 4,005,347 issued Jan. 25, 1977 and U.S. Pat. No. 4,015,182 issued Mar. 29, 1977, each of which are incorporated herein by reference. In these patents, a brushless DC motor has a stator with a plurality of windings therein, a rotor having a plurality of constant magnetic polar regions, and means for sensing the relative position of the rotor polar regions with respect to the stator. Positive signals developed by the position sensing means were processed by circuitry for selectively energizing the windings of the motor.

In the present day clothes washing or laundry machines having a generally coaxially arranged agitator and a spin tub, the agitator is rotated with an oscillating movement, and the rotation of the spin tub is unidirectional at a speed appreciably greater than that of the agitator oscillation. Of course, many different transmission mechanism and drive schemes have been employed in the past to effect the aforementioned particular oscillation and unidirectional rotation of the agitator and spin tub; however, it is believed that a disadvantageous or undesirable feature of such past schemes was that they were too costly and/or too complicated not only from the viewpoint of manufacture but also from the viewpoint of power usage and maintenance by the consumer.

SUMMARY OF THE INVENTION

Among the several objects of the invention may be noted the provision of an improved lamination, an improved method of making a core which overcomes the above discussed disadvantageous or undesirable features, as well as others, of the prior art; the provision of such improved method in which means for magnetically defining the polarity of some pole sections from adjacent pole sections is effective to retain the some pole sections against displacement from the rotatable assembly; the provision of such improved method in which a plurality of sets of magnetic material elements are wedged between the adjacent pole sections of the core; the provision of such improved method in which a hardenable nonmagnetic material is provided in a plurality of slots in the core between the adjacent pole sections to at least assist in retaining the magnetic material element sets against displacement from the slots; the provision of such improved method in which at least some of the pole sections are displaced in the core to effect the wedging of the magnetic material element sets between the adjacent pole sections; the provision of such improved method in which means provided for bridging generally across the slots in the core between the adjacent pole sections thereof are deformed upon the displacement of such at least some pole sections to effect the wedging of the magnetic material element sets between the adjacent pole sections with such bridging means being subsequently disjoined; the provision of such improved method wherein such disjoined bridging means cooperates with the hardenable nonmagnetic material within the slots to at least assist in retaining the magnetic material elements and the some pole pieces against displacement from the slots; and the provision of such improved lamination method, in which the components thereof are simplistic in design, easily assembled and economically manufactured. These as well as other objects and advantageous features of the present invention will be in part apparent and in part pointed out hereinafter.

Still further and in general, a method is provided in one form of the invention for making a ferromagnetic core adapted to be used in a dynamoelectric machine and with the core having a plurality of integrally connected ferromagnetic pole sections spaced apart generally about a peripheral portion of the core. In this method, a plurality of other ferromagnetic pole sections are located generally in preselected positions spaced between adjacent ones of the first named pole sections of the plurality thereof, and a plurality of sets of magnetic material elements are arranged between the other pole sections of the plurality thereof and the adjacent ones of the first named pole sections, respectively. A hardenable non-magnetic material is solidified in place at least within the core between the other pole sections, the first named pole sections and the magnetic material element sets of the plurality thereof so as not only to effect magnetic polarity definition between the first named pole sections and the other pole sections but also to retain the other pole sections against displacement from the preselected position thereof, respectively.

BRIEF DESCRIPTION OF THE DRAWING

FIG. 1 is an enlarged plan view of a punched out rotatable assembly lamination;

FIG. 2 is a functional box diagram illustrating a method of making a core in one form of the invention for use in a rotatable assembly of a dynamoelectric machine;

FIGS. 3-8 are enlarged partial views of the lamination of FIG. 1 and illustrate principles which may be practiced in the method represented by the functional box diagram of FIG. 2;

FIG. 9 is an end view of a rotatable assembly which may be formed in accordance with the method illustrated by the functional box diagram of FIG. 2;

FIG. 10 is a sectional view taken along line 10—10 of FIG. 9.

FIG. 11 is a sectional view taken along line 11—11 of FIG. 10;

FIG. 14 is a partial sectional view taken from FIG. 13 illustrating the disposition of coils of the winding stages with a coil receiving slot of the stationary assembly;

FIG. 15 is a schematic diagram illustrating the distribution of the winding stages in the coil receiving slots of the stationary assembly in FIG. 13;

FIGS. 15A and 15B are schematic diagrams illustrating the distribution of alternative winding stages as they may be arranged in the coil receiving slots of the stationary assembly of FIG. 3, respectively;

FIG. 26 is an enlarged partial view partially in cross-section taken from FIG. 25;

Corresponding reference characters refer to corresponding parts throughout the several views of the drawings.

Figure 12:
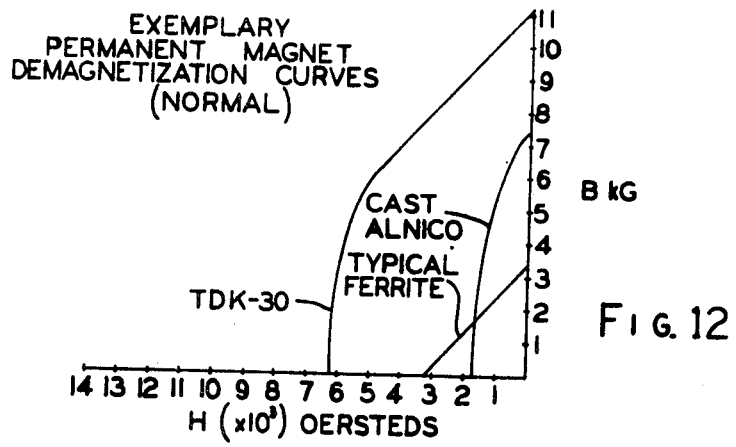
FIG. 12 is a graphical representation illustrating the magnetic properties of magnetic material elements utilized in the rotatable assembly of FIGS. 9-11 as well as those of other magnetic material elements.

The exemplifications set out herein illustrate the preferred embodiments of the invention in one form thereof, and such exemplifications are not to be construed as limiting the scope of the invention in any manner.

DETAILED DESCRIPTION OF THE PREFERRED EMBODIMENTS

Referring now to the drawings in general, there is shown at 41 a lamination adapted to be used in a ferromagnetic core or rotor 43 of a dynamoelectric machine, such as an electronically commutated motor or brushless DC motor 45 or the like for instance (FIGS. 1, 9-11 and 16-18). Lamination 41 has a unitary body 47 blanked or otherwise formed from a generally thin ferromagnetic material, such as an electrical grade sheet steel or the like for instance, and a plurality of pole sections 49 are spaced apart from each other generally about the body (FIG. 1). A plurality of means, such as inner peripheral bridges or connecting arms 51 for instance, on body 47 are interposed between adjacent ones of pole sections 49 for bridging therebetween, respectively. A plurality of other pole sections 53 of body 47 are interposed in spaced relation between the adjacent ones of pole sections 49, and a plurality of sets or pairs of other means, such as outer peripheral bridges or connecting arms 55 or the like for instance, are interposed between the adjacent ones of pole sections 49 and pole sections 53 for bridging therebetween, respectively.

More particularly and with specific reference to FIG. 1, body 47 of lamination 41 has a pair of radially spaced outer and inner peripheral edges 57, 59 with the inner peripheral edge defining a generally centrally located shaft receiving bore or the like through the body, as discussed hereinafter. A plurality of openings, such as generally V-shaped apertures or slots 61 for instance, are provided through body 47 between peripheral edges 57,59 thereof, respectively, and the openings are arranged with each other in generally arcuate spaced relation about the body. Thus, pole sections 49 respectively are defined on body 47 generally between adjacent ones of openings 61.

Each of openings 61 has a pair of leg parts 63,65 tapering toward each other generally in a direction from outer peripheral edge 57 toward inner peripheral edge 59. Leg parts 63,65 each have a pair of opposite side edges 67,69 and 71, 73, and a pair of end edges or end portions 75,77 are interposed between the side edges generally adjacent outer peripheral edge 57 while a common end edge or end portion 79 is interposed between side edges 67,73 generally adjacent inner peripheral edge 59. Thus, side edges 67,73 of leg parts 63,65 are provided on adjacent ones of pole sections 49, and side edges 69,71 are provided on pole sections 53 between the adjacent ones of pole sections 49, respectively. Further, bridging means or inner bridges 51 are defined between inner peripheral edge 59 and common end edge 79 so as to integrally interconnect between pole sections 49, and sets or pairs of bridging means or outer bridges 55 are arranged between outer peripheral edge 57 and each end edge 75,77 of leg parts 63,65 in openings 61 so as to define narrow peripheral bands or strips on body 47 which may be deformed generally radially inwardly toward the leg parts, respectively, as discussed in detail hereinafter. Thus, bridges or bridge pairs 55 are integrally interconnected between each pole section 53 and the pole sections 49 adjacent thereto, respectively. Pole sections 53 are defined generally between side edges 69, 71 of leg parts 63,65 in openings 61 and extend therebetween generally radially inwardly from outer peripheral edge 57 toward inner peripheral edge 59. The radially inner ends of side edges 69,71 intersect with a free end edge 81 on pole section 53 which is arranged generally in opposite or facing relation with common end edge 79, and a pair of opposite tabs or abutments 83,85 integrally formed on each of pole sections 53 extend generally from the opposite side edges of the pole section at least generally adjacent the free end edge into leg parts 63,65 of openings 61, respectively. While openings 61 are described herein as being generally V-shaped in lamination 41, it is contemplated that other openings having different shapes may be employed within the scope of the invention so as to meet the objects thereof, and of course, such different shaped openings would also alter the shape of the pole sections.

Referring again in general to the drawings and recapitulating at least in part with respect to the foregoing, there is illustrated a method in one form of the invention for making, manufacturing or assembling rotor or core 43 which has a plurality of discrete polar regions or areas, such as generally defined by pole sections 49,53, with such polar regions or pole sections being spaced apart generally about a peripheral portion 87 of the rotor (FIGS. 3–10). In this method, pole sections 53 are positioned, disposed or otherwise located or arranged in preselected positions spaced between adjacent ones of pole sections 49 (FIGS. 1 and 3), and a plurality of sets or pairs of magnetic material elements 89,91 are disposed or otherwise arranged between pole sections 53 and the adjacent ones of pole sections 49, respectively (FIGS. 4 and 5). A hardenable nonmagnetic material 93 is provided in rotor 43 between pole sections 49,53 and magnetic material elements 89,91, so as to be solidified in place therebetween, and the nonmagnetic material acts along with the magnetic material elements to effect magnetic polarity definition between pole sections 49,53 while also retaining or maintaining the magnetic material elements and pole sections 53 in their preselected positions against displacement, respectively (FIG. 6). Hardenable material 93 may be aluminum, copper or respective alloys thereof or other nonmagnetic materials having good electrical conductivity properties.

More particularly and with specific reference to FIGS. 1–8 and 10, a plurality of laminations 41 are stacked or otherwise assembled together generally in juxtaposed or face-to-face relation, as illustrated generally in FIGS. 3 and 10, thereby to form a lamination stack 95 having a predetermined stack height or length required for rotor 43 of FIG. 10, and the stacking of the laminations is illustrated by functional diagram box 97 in FIG. 2. Either during or subsequent to the above discussed stacking of laminations 41 into rotor stack 95, openings 61 of the lamination are respectively aligned or otherwise arranged with each other so as to define a plurality of slots or slot openings 99 which extend through rotor 43 between a pair of opposite ends or end portions 101, 103 thereof, as best seen in FIGS. 3 and 10. Even though the alignment of openings 61 so as to form slots 99 may be accomplished during the stacking of laminations 41, as discussed above, such opening alignment is illustrated in a separate functional diagram box 105 of FIG. 2. Although slots 99 are shown as extending generally axially through rotor 43 between opposite ends 101, 103 thereof, it is contemplated that the slots may be slightly skewed during the alignment of openings 61 within the scope of the invention so as to meet at least some of the objects thereof. Further and albeit not shown for the sake of brevity, it is to be understood that suitable equipment may be employed to effect the stacking of laminations 41 and the alignment of openings 61 so as to form slots 99 through stator 43. Of course, it may also be noted that upon the above discussed alignment of openings 61, outer and inner peripheral edges 57, 59 of laminations 41 in stack 95 thereof are also generally aligned or otherwise arranged with each other so that outer peripheral edges 57 generally define peripheral portion or wall 87 on rotor 43 between opposite ends 101, 103 thereof and inner peripherial edges 59 generally define a shaft receiving bore 107 extending through the rotor between the opposite ends thereof, respectively, as best seen in FIG. 10. Of course, the particular edges on laminations 41 which define openings 61 therethrough, as discussed hereinabove, are also disposed generally in alignment with each other upon the alignment of the openings so as to form slots 99 in rotor stack 95, and such particular edges in their aligned formation define wall or wall means of the slot; however, for the sake of brevity, such slot walls will be designated by the reference numeral of such particular edges corresponding thereto when referred to hereinafter.

Magnetic material elements 89,91, such as elongate block or bar magnets for instance, are provided with a pair of opposite generally flat surfaces or faces 109, 111 interposed between a pair of opposite generally flat intermediate surfaces or end faces 113, 115, respectively. When openings 61 of laminations 41 are aligned through rotor stack 95 to define slots 99 thereof, as discussed above, magnets 89,91 are respectively inserted, placed, positioned or otherwise disposed within of the slots so that opposite faces 109,111 of the magnets are arranged generally in facing relation with opposite sidewalls 67,69 and 71, 73 of the slots extending through rotor stack 95, respectively, as shown in FIG. 4. In other words, opposite faces 109, 111 of magnets 89,91 extend generally in face-to-face relation with pole sections 49,53 generally throughout their lengths with respect to slots 99 between opposite end faces 101, 103 of rotor stack 95. Of course, due to manufacturing tolerances for both lamination 43 and magnets 89, 91, it is contemplated that the magnets may be generally loosely positioned in slots 99. Upon the placement of magnets 89,91 within slots 99, opposite intermediate surfaces 115 of the magnets may be seated or otherwise located on opposite tabs 83,85 of pole sections 53 so that the other opposite intermediate surace 113 of the magnets are spaced from outer bridges or bridge sections 55 in rotor stack 95. Magnets 89,91 are available from TDK Electronics Co., Ltd., 2-14-6, Uchikanda, Chiyoda-ku, Tokyo, Japan under Model No. TDK-30 and generally have the magnetic characteristics as illustrated in the graph of FIG. 12. The placement of magnets 89,91 in slots 99 is illustrated in functional diagram box 117 in FIG. 2. While the particular shape and magnetic characteristics of magnets 89,91 are disclosed herein, it is contemplated that other magnets having other shapes and/or other magnetic characteristics may be employed in rotor 43 within the scope of the invention so as to meet the objects thereof, and it is also contemplated that more than two magnets may be utilized in the definition of a polar region of the rotor within the scope of the invention so as to meet the objects thereof. For the sake of comparison, the magnetic characteristics of some of the above mentioned other magnets which might be employed in rotor 43 are also shown in the graph of FIG. 12.

After the placement of magnets 89,91 within slots 99 of rotor stack 95, outer bridges 55 of laminations 41 are displaced or otherwise deformed generally along the entire length of the rotor stack between opposite ends 101, 103 thereof in a direction generally inwardly of the core stack or toward leg parts 63,65 of the slots, as shown in FIG. 5. Bridges 55 in rotor stack 95 may be so deformed by a tool 119, as illustrated schematically in FIG. 5, forced against outer peripheral portion 87 of rotor 43 generally along the bridges. In response to this deformation of outer bridges 55, pole sections 53 and magnets 89,91 are movable therewith and relative to pole sections 49 so that opposite faces 109, 111 of the magnets are abutted or otherwise engaged generally in face-to-face relation with pole sections 49 and pole sections 53, respectively. Of course, this deformation of outer bridges 55 and the resulting movement of pole sections 53 and magnets 89,91 is just great enough to take up the aforementioned manufacturing tolerances therebetween to insure that opposite faces 109,111 of the magnets are engaged in the face-to-face relation with pole sections 49,53 generally along the lengths thereof in slots 99. However, if the aforementioned manufacturing tolerances between magnets 89,91 and pole sections 49,53 are satisfactory so as to afford an acceptable or desirable flux transfer relation therebetween, it is contemplated that the above discussed deformation of bridges 55, as illustrated in functional diagram box 121, of FIG. 2, may be omitted from the method of manufacturing rotor 43 within the scope of the invention so as to meet the objects thereof. Albeit not shown for the purpose of disclosure brevity, it is understood that suitable equipment may be utilized to effect the deformation of outer bridges 55 generally simultaneously or in any given order so as to effect the tolerance take-up movement of pole sections 53 and magnets 89,91, as discussed above.

With magnets 89,91 so respectively positioned within slots 99 in abutment between pole sections 49, 53, a squirrel cage winding, indicated generally at 123 in FIGS. 9 and 10, is integrally formed with rotor stack 95, and the squirrel cage winding comprises a plurality of rotor bars 125 extending through the slots and integral with a pair of opposite generally annular end rings 127, 129 disposed on opposite ends 101, 103 of the core stack between peripheral portion 87 and bore 107 thereof, respectively. If desired, a plurality of fan blades 131 may also be integrally formed with end rings 127, 129, respectively. Of course, it is contemplated that suitable equipment may be employed to effect the formation of squirrel cage winding 123 with rotor stack 95; however, for the sake of brevity, a disclosure of such equipment is omitted. In the formation of squirrel cage winding 123, hardenable material 93 is provided or otherwise introduced into the interstices within slots 99 generally about magnets 89,91 therein and between pole sections 49, 53 and inner and outer bridges 55,59, respectively, as shown in FIG. 6. Thus, hardenable materials 93 fills the aforementioned interstices within slots 99 throughout the lengths thereof between the opposite ends 101, 103 of rotor stack 95, so as to define bars 125 therein, and generally simultaneously therewith, opposite end rings 127, 129 of the hardenable material are formed or otherwise defined on opposite ends 101, 103 of the rotor stack, respectively. Of course, hardenable material 93 may be poured, cast, injected or otherwise provided in slots 99 of rotor stack 95 so as to effect the generally simultaneous formation of bars 125 and opposite end rings 127, 129 of squirrel cage winding 123 with the rotor stack upon the solidification in place of the hardenable material. The formation of squirrel cage winding 123 is illustrated generally by a functional diagram box 133 in FIG. 2.

When hardenable material 93 is solidified in situ so as to form squirrel cage winding 123 on rotor stack 95, as discussed above, a part of each deformed outer bridge 55 may be removed from peripheral portion 87 of the core stack so as to provide a plurality of grooves or spaces 135 between pole sections 49, 53 disjoining or otherwise disassociating them along the entire length of the core stack between opposite ends 101, 103 thereof, respectively, as shown in FIG. 7 and illustrated by a functional diagram box 137 in FIG. 2. To effect this aforementioned disjoinder of pole sections 49, 53, a tool, such as a milling or broaching tool or the like for instance as schematically illustrated at 139 in FIG. 7, may be engaged with deformed outer bridges 55 on peripheral portion 87 of rotor stack 95 and operated to machine away portions or sections of the bridges along the entire length of the core stack between opposite ends 101, 103 thereof so as to effect the physical separation or disjoinder of pole sections 49, 53. However, it should be noted that upon the above described disjoinder of pole sections 49, 53, grooves 135 are located or otherwise arranged between the pole sections so that remaining parts or sections of deformed bridges 45 define a pair of opposed flanges or extensions 141, 143 on adjacent ones of pole sections 49 which extend therefrom in part over leg parts 63,65 of slots 99 along the length of rotor stack 95 betwen opposite ends 101, 103 thereof, respectively. It is, of course, contemplated that deformed outer bridges 55 may be machined generally simultaneously or in any selected order within the scope of the invention so as to meet at least some of the objects thereof. Also, it is contemplated that suitable equipment may be utilized to effect the machining of deformed outer bridges 55, but for the sake of brevity, a disclosure of such equipment is omitted.

Upon the above discussed disjoinder of pole sections 49, 53, it may be noted that portions of hardenable material 93 are predeterminately solidified in place or otherwise arranged between the pole sections within slots 99 so as to be abutted or otherwise engaged between opposed flanges 141, 143 on pole sections 49 and opposite surfaces 113 of magnets 89, 91. Since opposite surfaces 115 of magnets 89,91 are seated on opposite tabs 83,85 of pole sections 53, the coaction of the magnets and the aforementioned portions of hardenable material 93 engaged between flanges 141, 143 and opposite surfaces 113 of the magnets serve to cage or otherwise retain or maintain pole sections 53 against displacement from slots 99, respectively. Further, it may also be noted that the disposition of hardenable material 93 and magnets 89, 91 within slots 99 in abutment between pole sections 49,53 also serve to effect the magnetic polarity definition between the pole sections. In other words, hardenable material 93 and magnets 89,91 in their respective abutting or spacing relation between pole sections 49,53 effectively magnetically define the polarity of pole sections 53 from that of adjacent ones of pole sections 49 which are integrally interconnected with each other by inner bridges 59. Thus, in response to the magnetic affect of magnets 89,91, pole sections 53 are each magnetized so as to have the same polarity while pole sections 49, which are integrally interconnected by inner bridges 59, each are magnetized so as to have a polarity opposite to that of pole sections 53. In view of the foregoing, it may be further noted that pole sections 49,53 define discrete constant polar regions or areas extending generally about peripheral portion 87 of rotor 43 and between opposite ends 101, 103 thereof, respectively.

Subsequent to the disjoinder of pole sections 49, 53 in rotor stack 95, peripheral portion 87 thereof may be turned or otherwise machined to provide the rotor stack with a preselected diameter. As seen in FIG. 8 and as illustrated by a functional diagram box 145 in FIG. 2, outer peripheral edges 57 of laminations 41 in rotor stack 95 may be engaged and machined by a tool, such as a lathe bit or the like for instance illustrated schematically at 147 in FIG. 8, thereby to provide peripheral portion 87 of the rotor stack with a preselected outside diameter generally between opposite ends 101, 103 thereof. While the above discussed turning of rotor stack 95 to the preselected outside diameter thereof may be performed by certain equipment, such as a lathe or the like for instance, a disclosure of such equipment is omitted for the sake of brevity.

With respect to the magnetization of magnets 89,91, it is preferred that such magnetization be accomplished upon the assembly of electronically commutated motor 45, as discussed hereinafter. In other words, once electronically commutated motor 45 is assembled together, pole sections 49,53 of rotor 43 may be aligned under a particular one of the winding stages of the electronically commutated motors, and when so aligned, a relatively high current may be passed through such particular one winding stage thereby to effect the magnetization of magnets 89,91, as well known in the art. Of course, it is contemplated that suitable equipment may be utilized to effect the manipulation of magnets 89,91 in rotor 43, as discussed above, but for the sake of brevity, a description of such suitable equipment is omitted. While the magnetization of magnets 89,91 in rotor 43 as discussed above is preferred, it is also contemplated that the magnets could be magnetized before they are disposed in rotor slots 99 or subsequent to the completion of the assembly of rotor 43 by magnetizing pole sections 49,53 thereof all at the same time within the scope of the invention so as to meet at least some of the objects thereof.

Referring again in general to the drawings and recapitulating at least in part with respect to the foregoing, there is shown a rotatable assembly 151 which is adapted to be used in dynamoelectric machine 45 (FIGS. 9–11 and 18). Rotatable assembly 151 comprises rotor 43 having a plurality of means, such as slots 99 which may be thought of as including grooves 135 for receiving pole sections 53 in the rotor (FIGS. 10 and 11). Means, indicated generally at 153, is provided in receiving means or slots 99 for defining the the magnetic polarity of pole sections 53 with respect to adjacent parts of rotor 43, such as for instance the ones of pole sections 49 of the rotor adjacent pole sections 53, and for retaining or maintaining pole sections 53 against displacement from the slots, respectively (FIGS. 10 and 11). Defining and retaining means 153 include magnets 89,91 disposed between pole sections 49,53 and hardenable material 93 solidified in place in slots 99 between pole sections 49,53 and the magnets, respectively (FIGS. 10 and 11).

More particularly and with specific reference to FIGS. 9–11, rotor 43 has its shaft receiving bore 107 defined therein by inner peripheral edges 59 of laminations 41 in rotor stack 95, and the bore intersects with opposite ends 101, 103 of rotor 43, respectively, as previously mentioned. A shaft 155 is disposed in bore 107 in displacement preventing engagement with rotor 43, and a pair of opposite extensions or end sections 157,159 on the shaft extend generally axially beyond opposite ends 101, 103 of rotor 43, the shaft extensions being adapted to be suitably journaled in dynamoelectric machine 45, as discussed hereinafter. Rotor 43 and shaft 155 may be assembled together in the displacement preventing engagement by suitable means, such as press-fitting or heat shrinking for instance. In the preferred embodiment of rotatable assembly 151, rotor 43 is heated to effect expansion of bore 107 therein, and at least one of the rotor and shaft 155 are moved with respect to the other thereof in order to position the bore in a preselected coaxial location about the shaft with respect to at least one of opposite extensions 157, 159 thereof. When so located, rotor 43 is allowed to cool thereby to effect the contraction or heat shrinking of the rotor and its bore 107 into the displacement preventing or gripping engagement with shaft 155 in the preselected coaxial location thereon. While rotatable assembly 151 is disclosed having eight poles, it is contemplated that other rotatable assemblies having different numbers of poles may be utilized within the scope of the invention so as to meet at least some of the objects thereof.

Figure 13:
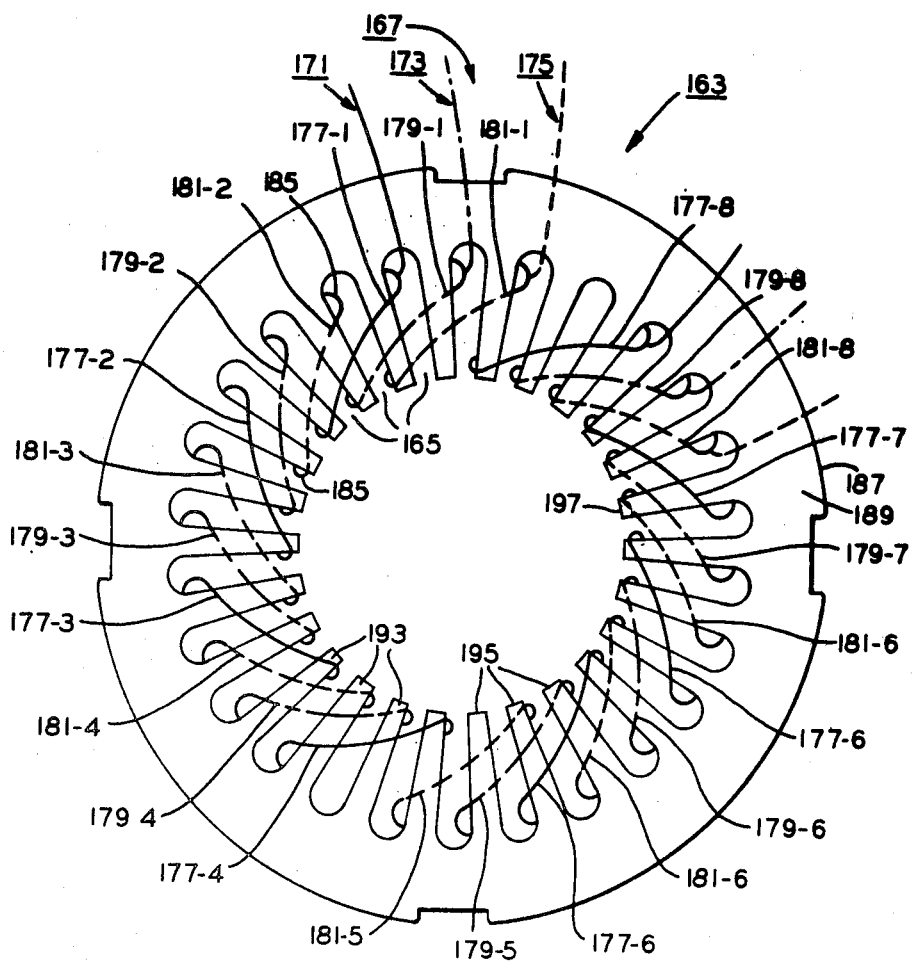
FIG. 13 is a greatly enlarged end view illustrating a stationary assembly with a plurality of winding stages schematically shown and arranged in the stationary assembly.

With reference again in general to the drawings, a stationary assembly 161 shown is adapted to be used in electronically commutated motor 45 (FIGS. 13–18). Stationary assembly 161 comprises a ferromagnetic core or stator 163 with a plurality of winding receiving slots 165 disposed generally thereabout (FIGS. 13 and 14). A multi-stage winding arrangement, indicated generally at 167, includes a plurality of winding stages 171, 173, 175 each having a plurality of coils 177-1 to 177-8, 179-1 to 179-8 and 181-1 to 181-8 with each of the coils thereof having at least one conductor turn 183 with opposite side portions 185 received or otherwise accommodated in respective ones of slots 165, respectively (FIGS. 13 and 15). Most, or at least some, of coils 177, 179, 181 in winding stages 171, 173, 175 have a side turn portion 185 thereof sharing a respective one of slots 165 with a side turn portion of other coils in the same winding stage, respectively (FIGS. 13 and 15). Two pair of coils 179 in winding stage 173 have a side turn portion 185 thereof sharing respective ones of slots 165 with two pairs of coils 177, 181 in winding stages 171, 175, and two pairs of coils 167, 181 of winding stages 171, 175 have a side turn portion thereof which do not share a respective one of slots 165, respectively (FIGS. 13 and 15).

Figure 18:
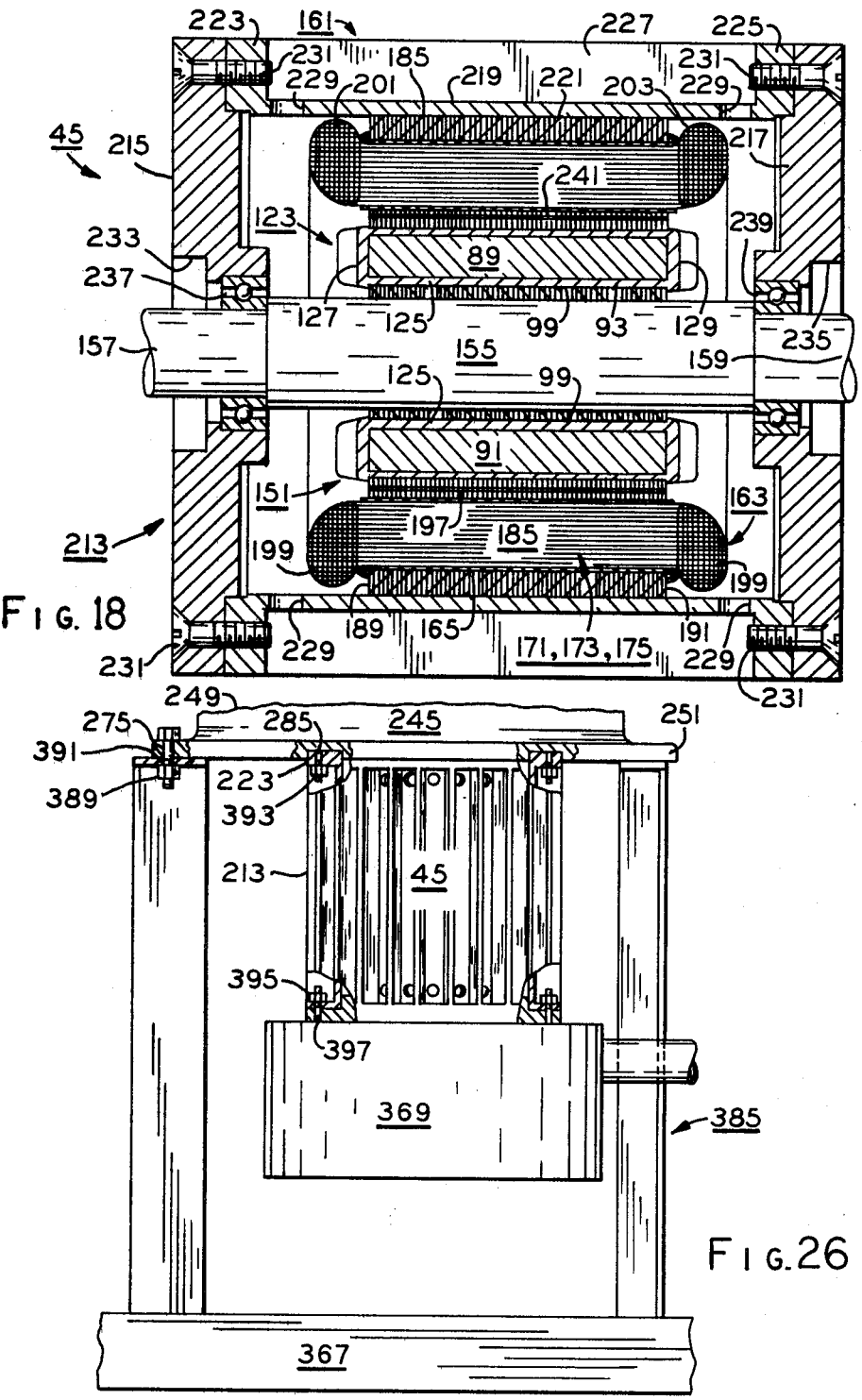
FIG. 18 is a sectional view taken along line 18—18 of FIG. 17.

More particularly and with specific reference to FIGS. 13–15, and 18, stator 163 has a generally cylindric shaped peripheral portion or section 187 interposed or interconnected between a pair of opposite end faces or portions 189, 191 of the stator; however, it is contemplated that other stators having various other shapes, such as opposite peripheral flats thereon for instance as well as other slot shapes or configurations, may be utilized within the scope of the invention so as to meet at least some of the objects thereof. A plurality of teeth 193 are integrally formed on stator 163 between adjacent ones of winding slots 165 with the teeth and slots extending generally axially through the core so as to intersect with opposite end faces 189, 191 thereof, and the teeth have generally arcuately spaced apart tips or radially inner ends 195 which define, at least in part, a bore 197 extending generally axially through the core between the opposite end faces thereof, respectively. While twenty-six winding slots 165 are disclosed in stator 163, it is contemplated that other stators having more or less winding slots, as discussed hereinafter, and also having winding slots of various other shapes may be utilized within the scope of the invention so as to meet at least some of the objects thereof. Furthermore, while teeth 193 and tips 195 thereof are illustrated herein as being generally radially extending or straight, it is contemplated that teeth and tips thereof having various other shapes or positions in stator 163 could be employed within the scope of the invention so as to meet at least some of the objects thereof. Thus, as best seen in FIGS. 13 and 14, side portions 185 of coils 177, 179, 181 in winding stages 171, 173, 175 may be placed or otherwise inserted either manually or by suitable automatic coil injection equipment (not shown) generally from bore 197 of stator 163 between adjacent ones of teeth 193 and tips 195 thereof into winding slots 165, respectively. Since coil side portions 185 are arranged within winding slots 165, opposite end turns or end turn portions 199 of coils 177, 179, 181, which integrally connect with opposite side turn portions 185 thereof, are arranged so as to form a pair of opposite end turn groupings 201, 203 adjacent opposite end faces 189, 191 of stator 163 extending generally about bore 197 radially outwardly thereof, as best seen in FIG. 18.

As best seen in FIG. 14, a slot liner 205 of suitable insulating material is disposed in each of slots 165 so as to insulate side turn portions 185 of coils 177, 179, 181 disposed in respective ones of the slots from stator 163; however, it is contemplated that other types of slot lining insulation, such as a resin insulation layer deposited on or otherwise integrally formed with the stator for instance, may be utilized within the scope of the invention so as to meet at least some of the objects thereof. Further, a slot wedge 207 of suitable insulating material is disposed across each of slots 165, so as to engage adjacent ones of teeth 193 at least adjacent tips 195 thereof thereby to contain side turn portions 185 of conductor turns 183 against displacement from the slots, respectively. Thus, due to the aforementioned winding configuration or arrangement of coils 177, 179, 181 of winding stages 171, 173, 175, one of opposite side turn portions 185 of the coils is positioned in a top section 209 of a respective one of slots 165 and the other of the opposite side turn portions of the coils is positioned in a bottom section 211 thereof, respectively, with only the exception of the coil side turn portions which do not share slots, as discussed in detail hereinafter. Albeit not shown, suitable insulation between winding stages 171, 173, 175 including end turn groupings 201, 203 thereof may be utilized, if desired, within the scope of the invention so as to meet at least some of the objects thereof.

Coils 177, 179, 181 of the three winding stages 171, 173, 175 are disposed in slots 165 of stator 163 generally in the aforementioned lapped winding configuration, FIGS. 13-15; however, it is contemplated that not only a greater or lesser number of winding stages but also winding stages having different winding configurations, such as those illustrated in FIGS. 15A and 15B for instance, may be employed within the scope of the invention so as to meet at least some of the objects thereof. Further, it may be noted that each of coils 177, 179, 181 in each winding stage spans three of teeth 193, i.e., coil side turn portions 185 are contained in every fourth one of slots 165; however, it is contemplated that the coils may span a greater or lesser number of teeth within the scope of the invention so as to meet at least some of the objects thereof. In multi-stage winding arrangement 167, it may be noted that coils 177-1 to 177-3 and 177-5 to 177-7 of winding stage 171, coils 179-2, 179-3 and 179-5 to 179-7 of winding stage 173, and coils 181-2 to 181-4 and 181-6 to 181-8 of winding stage 175 have one of their opposite side turn portions 185 sharing a respective one of slots 165 with one of the side turn portions of the coils in the same winding stage. It may also be noted that coils 179-1, 179-5 and 179-2, 179-4 of winding stage 173 have one of side turn portions 185 thereof sharing a respective one of slots 165 with one side turn portion 185 of coils 177-4, 177-8 and 181-3, 181-5 in winding stages 171, 175, respectively. Further, it may also be noted that coils 177-1, 177-5 and 181-4, 181-8 of winding stages 171, 175 each have a side turn portion 185 which does not share a respective one of slots 165, respectively.

An alternative multi-stage winding arrangement for stator 163 is shown schematically in FIG. 15A. In this alternative winding arrangement 167a, coils 177-1 to 177-8 of winding stage 171 are disposed in the bottom sections 211 of slots 165, coils 179-1 to 179-8 of winding stage 173 are disposed in the top sections 209 of the slots, and coils 181-1 to 181-8 of winding stage 175 are disposed in the slots between the aforementioned coils in the top and bottom sections of the slots.

Another alternative multi-stage winding arrangement 167b for stator 163 is shown schematically in FIG. 15B. Although alternative winding arrangement 167b is somewhat similar to winding arrangement 167a, it may be noted that coils 177-5 to 177-8 of winding stage 171 are shifted to the top sections 209 of slots 165 while coils 179-5 to 179-8 of winding stage 173 are shifted to the top sections 211 of the slots for reactance purposes. Of course, coils 181-1 to 181-8 of winding stage 175 are disposed in slots 165 between the top and bottom sections 209, 211 thereof.

Figure 16:
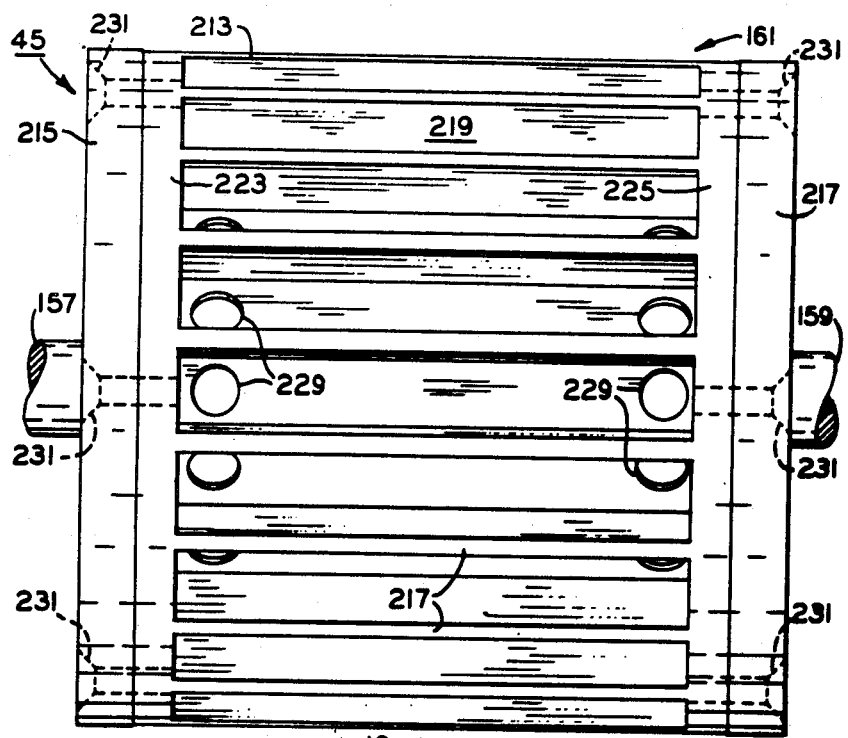
FIG. 16 is an actual size plan view illustrating an electronically commutated motor.
Figure 17:
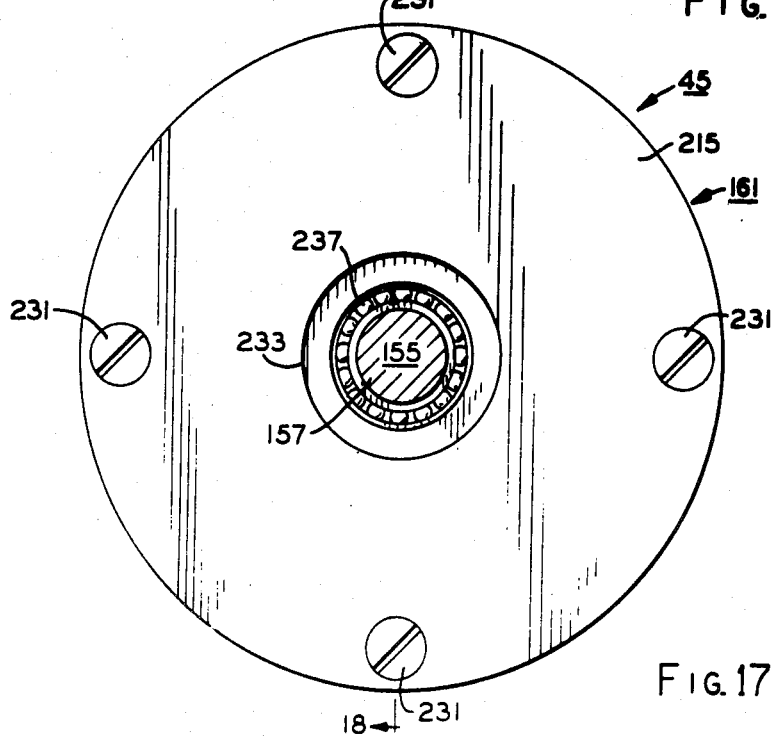
FIG. 17 is an end view of the electronically commutated motor of FIG. 16.

Referring now to FIGS. 16-18, electronically commutated motor or brushless DC motor 45 comprises stationary assembly 161 with stator 163 thereof disposed within a housing 213, and rotatable assembly 151 is arranged in magnetic coupling relation with the stator and suitably journaled in a pair of opposite end shields 215, 217 of the stationary assembly which are secured to the housing, respectively.

More particularly, housing or shell 213 comprises a generally cylindric sleeve 219 which may be formed of any desired material, and the sleeve has a bore 221 extending therethrough between a pair of opposite annular end flanges 223, 225 of the like integrally formed with the sleeve. A plurality of cooling fins 227 are integrally formed on sleeve 219 externally thereof between end flanges 223, 225, and a plurality of vent holes 229 may be provided, if desired, through the sleeve adjacent the end flanges so as to intersect with sleeve bore 221, respectively. Peripheral portion 187 of stator 163 is received within sleeve bore 213 being retained therein by suitable means, such as for instance a press-fit or heat shrinking between the peripheral portion of the stator and the sleeve bore. While housing 213 is illustrated for purposes of disclosure, it is contemplated that other housings having other component parts different from those illustrated herein may be utilized within the scope of the invention so as to meet the objects thereof.

End shields 215, 217 are secured to housing 213 adjacent opposite end flanges 223, 225 of sleeve 219 by suitable means, such as a plurality of screws 231 or the like for instance, respectively. A pair of generally centrally located bearing openings 233, 235 extend through end shields 215, 217, and a pair of bearing means such as self-lubricating bearings 237, 239 for instance, are mounted in the openings respectively. Rotor 43 of rotatable assembly assembly 151 is generally coaxially arranged within stator bore 197 of stationary assembly 161 so as to provide a predetermined air gap 241 therebetween, and shaft extensions 157, 159 of the rotatable assembly extend through bearings 237, 239 so as to be journaled thereby, respectively. Thus, it may be noted that pole sections 49,53 of rotor 43 are disposed in magnetic coupling relation with with winding stages 171, 173, 175 in stator 163 which are adapted to be commutated or energized in a plurality of preselected sequences and/or a plurality of preselected different sequences, as discussed hereinafter. Albeit not shown, the commutation of winding stages 171, 173, 175 in the aforementioned plurality of preselected sequences and/or plurality of preselected different sequences may be effected through the connection of such winding stages with suitable circuitry, such as for instance that disclosed in the commonly assigned copending applications of David M. Erdman and Harold B. Harms Ser. No. 141,268 filed Apr. 17, 1980 (now U.S. Pat. No. 4,390,826 issued June 28, 1983) and David M. Erdman Ser. No. 141,267 filed Apr. 17, 1980 (now abandoned), and each of these copending applications is incorporated by reference herein.

While stator 163 of electronically commutated motor 45 may have some characteristics comparable to those of a conventional A.C. motor, such as for instance being wound by existing coil winding and placement equipment employed in the manufacture of A.C. motors, it may be noted that the number of slots 165 employed in stator 163 to accommodate multi-stage winding arrangement 167 is different than the product of an integer multiplied by the number of poles in rotatable assembly 151. In this vein, an alternative designation of the required number of slots 167 in stator 165 may be stated by the following equation:

$$s = P(S)(X) \pm y$$

where s = number of slots in stator 165;
P = number of poles in rotatable assembly 151;
S = the number of winding stages;
X = a selected integer greater than zero; and
y = an integer not less than one or greater than two.

Thus, it may be noted that the twenty-six winding slots 165 in stator 163 accommodates the three winding stages 171, 173, 175 magnetically coupled with the eight poles of rotatable assembly 151 so as to satisfy the aforementioned equation, and the number of slots in the stator, i.e., twenty-six slots, is different than the product of an integer multiplied by the eight poles of the rotatable assembly.

Figure 19:
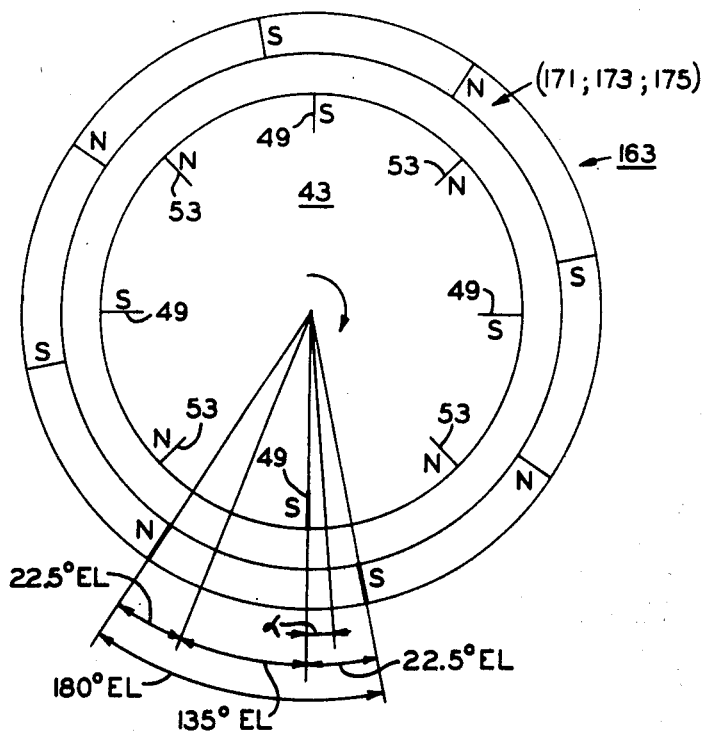
FIG. 19 is a diagrammatic representation illustrating positions of pole sections in the rotatable assembly of the electronically commutated motor of FIGS. 16-18 with respect to the winding stages in the stationary assembly thereof at the instant one of the winding stages is commutated so as to be excited.
Figure 20:
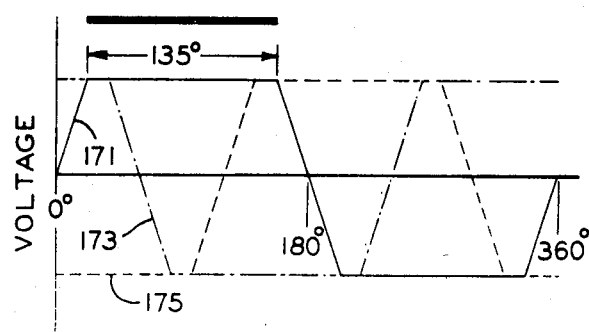
FIG. 20 is a graphical representation of the voltage which may be developed upon the selective energization of the winding stages in the electronically commutated motor of FIGS. 15-19.

In the operation of electronically commutated motor 45 with reference to FIG. 19, it is desirable to provide an advanced timing angle, i.e., an advancement of the energization of commutation of winding stages 171, 173, 175, which is defined as angle α in FIG. 20. In explanation of this timing angle advancement, zero advancement would occur in electronically commutated motor 45 if one of winding stages 171, 173, 175 thereof would be energized at the instant the magnetic center of one of pole sections 49,53 in rotor 43 rotated into a position spaced approximately twenty-two and one-half electrical degrees from the axis of one of the magnetic pole established by the energization of such one winding stage. Of course, zero advancement is believed to be the theoretical optimum with zero winding stage inductance, and energization of the aforementioned one winding stage a preselected number of electrical degrees before the theoretical optimum position of rotor 43 is attained comprises the advancement of commutation, i.e., advanced timing angle α. Of course, the particular advanced timing angle α selected for the operation of electronically commutated motor 45 may be incorporated into the circuitry of the aforementioned applications Ser. No. 141,268 and Ser. No. 141,267 which, as previously mentioned, is operable to effect the switching or energization of winding stages 171, 173, 175 in the plurality of preselected sequences and/or preselected different sequences thereof. In further explanation, the preferred amount of advancement of timing angle α is associated with the L/R time constant of multi-stage winding arrangement 167. At the aforementioned zero advancement, current in winding stages 171, 173, 175 would build up too slowly to achieve maximum possible torque throughout the full "on" time. Thus, advancing the commutation angle, as discussed above, takes advantage of the fact that the generated back emf is less during incomplete coupling, i.e., when the polar axii of rotor 43 and the energized one of winding stages 171, 173, 175 are not in exact alignment; therefore, current build-up time and torque development can be improved. If the advanced timing angle is too great, current overshoots may occur thereby to adversely affect efficiency; therefore, the optimum value of the advanced timing angle depends to some extent on the desired speed at which electroncially commutated motor 45 is operated and the torque desired therefor.

With continued reference to FIG. 19, assume that winding stage 171 of multi-stage winding arrangement 167 in electronically commutated motor 45 is instantaneously energized, and under this assumption, the centers of the north and south magnetic poles established by winding stage 171 have been noted as N171 and S171, respectively. The general location of the polar axii or centers of polar sections 49, 53 of rotor 33 are designated as S49, N53 and S49 and N53, respectively. If winding stages 171, 173, 175 were commutated with the aforementioned zero advancement in a preselected sequence thereof, the N,S poles associated with respective ones of the winding stages will appear and disappear as the winding stages are energized and de-energized in the preselected sequence thereof. Thus, as may be noted from FIG. 19, when the center of the magnetic poles S49, N53 of rotor 43 are positioned twenty-two and one-half electrical degrees past a like one of stator poles N171, S171, theoretically winding stage 171 should be energized at this instant so as to establish the poles N171, S171, and winding stage 171 should remain energized during the subsequent one hundred thirty-five electrical degrees rotation of the rotor. Then, winding stage 171 would be de-energized. The next one of winding stages 173, 175 in the preselected sequence would be similarly energized. However, instead of commutating winding stages 171, 173, 175 with zero advancement in the preselected sequence thereof, as discussed above, it is preferred to effect the operation of electronically commutated motor 45 so that winding stages 171, 173, 175 thereof are commutated in advance of the theoretical commutation point or angle (i.e., zero advancement) by the predetermined advanced timing angle α (in electrical degrees).

In the light of the foregoing discussion, the commutation or energization of winding stages 171, 173, 175 in the preselected sequence thereof effects the magnetic coupling therewith of rotatable assembly 151 causing unidirectional rotation of the rotatable assembly in the clockwise direction, as indicated by the directional arrow in FIG. 19, with respect to stator 163. It may be noted that if winding stages 171, 173, 175 were so energized in a preselected sequence reverse to that discussed above, the magnetic coupling of the winding stages with rotatable assembly 151 would cause a reverse unidirectional rotation thereof in the counterclockwise direction with respect to stator 163. Further, it may also be noted that the rotational speed of rotatable assembly during the unidirectional rotation thereof in both the clockwise and counterclockwise directions may be varied by varying at least the frequency at which winding stages 171, 173, 175 are commutated in the preselected sequence thereof. In addition, it may be further noted that winding stages 171, 173, 175 may be commutated or energized in preselected different sequences effecting the magnetic coupling therewith of rotatable assembly 151 so as to cause oscillation of the rotatable assembly in both the clockwise and counterclockwise direction with respect to stator 163. The speed of such rotatable assembly oscillation may be varied in the same manner as discussed above, and the amplitude of such rotatable assembly oscillation may be varied by varying the successive energization of the winding stages 171, 173, 175 during the preselected different sequences of energization thereof. For instance, in determining the frequency of the amplitude for the oscillation of rotatable assembly 151, it is contemplated that winding stages 171, 173, 175 could be commutated so that the rotatable assembly acts as a generator. In other words, when winding stages 171, 173, 175 are so commutated, rotatable assembly 151 then generates a voltage which is induced into the winding stages creating a back emf thereby to effect the termination of the oscillation movement of the rotatable assembly generally at the preselected amplitude of such oscillation movement. Of course, the unidirectional rotation of rotatable assembly 151 may, if desired, also be terminated by shorting out winding stages 171, 173, 175 so that the rotatable assembly acts as a generator, or if desired, the winding stages may merely be de-energized.

FIG. 20 is a graphical representation of voltage of one winding stage, such as winding stage 171 for instance, developed by electronically commutated motor 45. The solid trapezoidal curve illustrates the instantaneous voltage in winding stage 171 for a revolution through one pair of adjacent pole sections 49, 53 in rotor 43. The dashed trapezoidal curves are similarly shown for winding stages 173 and 175 to represent their respective instantaneous voltage contributions. The heavy solid curve displays the net affect of winding stage 171 being energized for one hundred thirty-five electrical degrees only with winding stage 175 being energized for one hundred thirty-five electrical degrees and so on for winding stage 175. If a more detailed discussion is desired with respect to the commutation of winding stages 171, 173, 175 to effect the operation of electronically commutated motor 45, reference may be had to the aforementioned U.S. Pat. No. 4,005,347.

Figure 21:
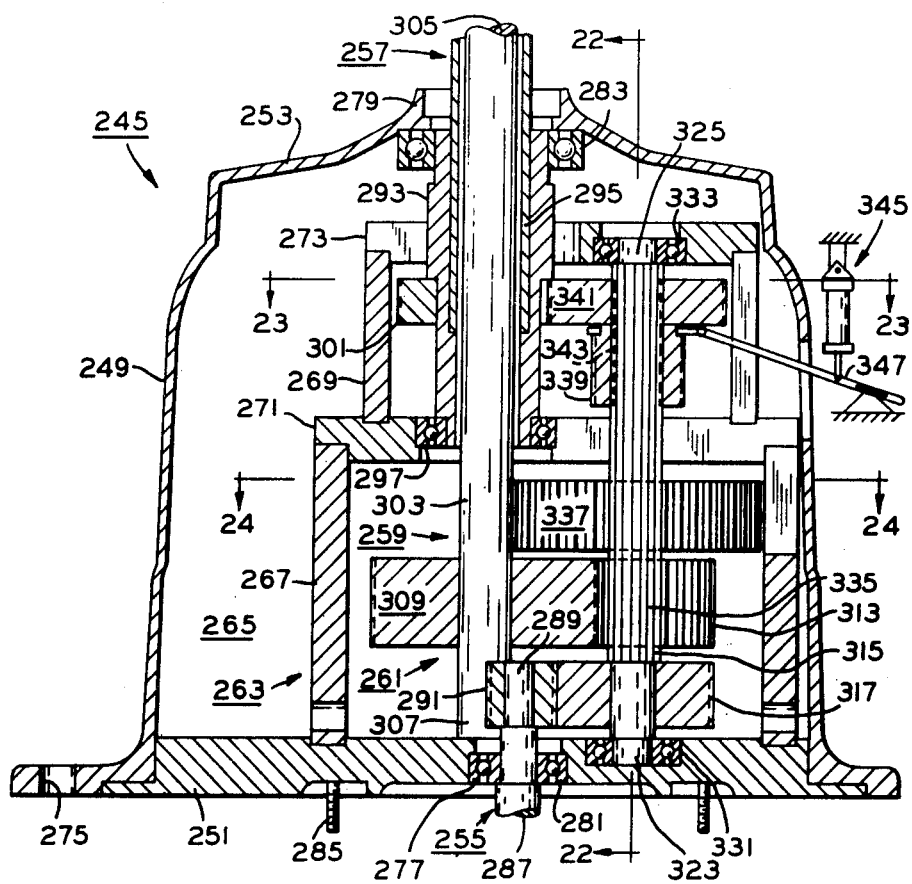
FIG. 21 is a sectional view illustrating a transmission mechanism adapted for use in a laundry machine.
Figure 23:
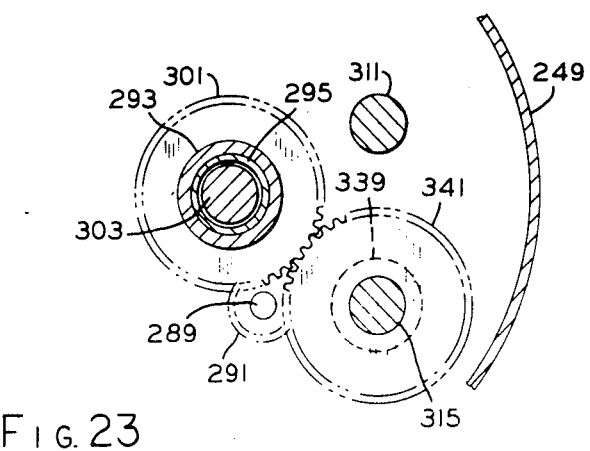
FIGS. 22-24 are sectional views taken along lines 22—22, 23—23 and 24—24 in FIG. 21, respectively.
Figure 24:
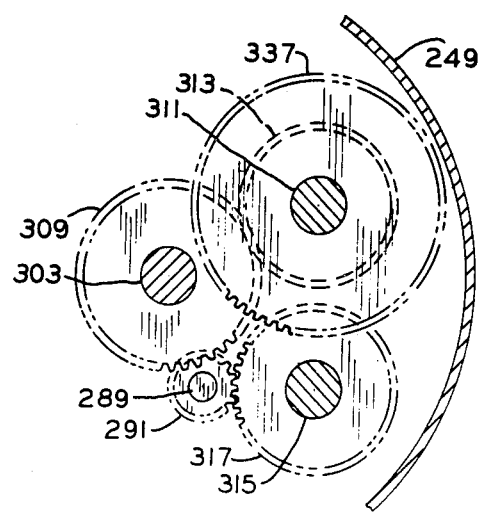

With reference again in general to the drawings, a transmission mechanism 245, which is adapted to be employed in a laundry or clothes washing machine 247, is shown having a housing or casing 249 with a pair of opposite end portions or walls 251, 253 (FIGS. 21-26). Input means 255 extending through opposite end portion or wall 251 of casing 249 is operable for rotation so as to oscillate in one operating mode of transmission mechanism 245 and also for rotation unidirectionally in another operating mode of the transmission mechanism (FIG. 21). A pair of generally coaxially arranged output means 257, 259 extending through opposite end portion or wall 253 of casing 249 are operable generally for conjoint rotation with input means 255 during the one and another operating modes of transmission mechanism 245, respectively (FIGS. 23 and 24). Means, indicated generally at 261, is disposed in casing 249 for transmitting to output means 257 the rotation of input means 255 during the aforementioned one operating mode while output means 259 is at rest and for transmitting to output means 259 the rotation of the input means during the afore-mentioned another operating mode while output means 257 is at rest, respectively.

More particularly and with specific reference to FIGS. 21-24, casing or cover 249 of transmission mechanism 245 encases a bearing support or housing indicated generally at 263, disposed within a chamber 265 of the casing. Bearing support 263 includes a pair of cylindric sidewalls 267, 269 with cylindric sidewall 267 being seated on casing end wall 251. An intermediate support wall or plate 271 is interconnected between cylindric sidewalls 267, 269, and an upper support wall or plate 273 is connected to the upper end of cylindric sidewall 269 generally adjacent end wall 253 of casing 249. A plurality of mounting openings 275 may be provided in casing 249 so as to mount transmission mechanism 245 in laundry machine 247, as discussed hereinafter. Opposite end walls 251, 253 have a pair of openings 277, 279 extending therethrough so as to intersect with chamber 265, and a pair of bearing means 281, 283 are supported in the openings in journaling engagement with input means 255 and output means 257, respectively. If desired, a plurality of mounting studs 285 may be integrally or otherwise provided on lower end wall 251 so as to extend therefrom for receiving electronically commutated motor 45 when transmission mechanism 245 is mounted in laundry machine 247, as discussed hereinafter.

Input means 255 includes an input shaft 287 journaled in bearing means 281 and extending through opening 277 in end wall 251 with a free end or end portion 289 disposed generally adjacent end wall 251 within chamber 265. An input or pinion gear 291 within chamber 265 is carried on free end 289 of input shaft 287 so as to be conjointly rotatable therewith, and the input shaft is adapted to be rotated or driven unidirectionally and also so as to oscillate in opposite directions.

Output means 257 includes a tubular output shaft 293 having a generally axial bore 295 therethrough, and the tubular output shaft extends through opening 279 in casing end wall 253. Output shaft 293 is journaled in bearing means 283 in casing end wall 253 and extends through support wall 273 so that a lower interior or free end of the output shaft is journaled in another bearing means 297 disposed in another opening 299 extending through intermediate support 271. An output, driven or pinion gear 301 is carried about tubular shaft 293 so as to be conjointly rotatable therewith, and the output gear is arranged so as to extend from the tubular shaft generally in spaced relation between supports 271, 273.

Output means 259 includes an output shaft 303 which extends generally coaxially through bore 295 of tubular shaft 293, and output shaft 303 has an exterior or free end or end portion 305 exteriorly of chamber 265 with an opposite interior free end or end portion 307 within the chamber, Albiet not shown, interior end 307 of output shaft 303 is journaled in a bearing means provided therefor in casing end wall 251, and exterior end 305 of output shaft 307 may be journaled in suitable bearing means (not shown) provided therefor. Another output, driven or pinion gear 309 is carried by output shaft 303 generally adjacent interior end 307 thereof so as to be spaced between casing end wall 251 and support wall 271 within chamber 265.

Transmitting means 261 is provided for transmitting the rotational movement of input shaft and gear 287,291 to tubular output shaft and gear 293, 301 and to output shaft and gear 303, 309, respectively. Transmitting means 261 includes means, such as a driving or idler shaft 311 and a pinion gear 313 carried thereon, associated in coupled relation with output shaft and gear 303, 309 for driving it, and means, such as a driven or idler shaft 315 and a pinion gear 317 carried thereon, associated in coupled relation with input shaft and gear 287,291 for being driven by it. Driving and driven means or idler shafts 311, 315 each have a pair of opposite end portions 319,321 and 323, 325 journaled in a pair of bearing means 327 329 and 331, 333 with bearing means 327, 331 being disposed in casing end wall 251 and bearing means 329 333 being disposed in upper support wall 273, respectively. Driven idler shaft 315 has a plurality of splines 335 extending axially thereabout between opposite ends 323, 325 of the driven idler shaft, and pinion gear 317 is carried on the driven idler shaft generally adjacent lower opposite end 323 thereof in meshing engagement with input gear 291. Thus, the mesh between input gear 291 and pinion gear 317 effects the concerted driven rotation of idler shaft 315 with input shaft 287. Pinion gear 313 is carried on driving idler shaft 311 so as to be arranged in meshing engagement with output gear 309 on output shaft 303, and therefor the meshing engagement between pinion gear 313 and output gear 309 effects the conjoint driven rotation of output shaft 303 with the driving idler shaft, as discussed hereinafter. Another pinion gear 337 is also carried on idler shaft 311 generally in spaced relation with pinion gear 313 thereon.

Figure 22:
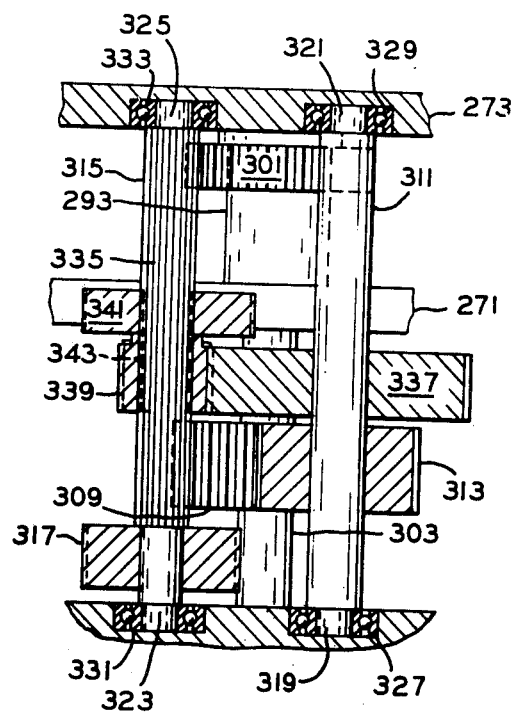

Transmitting means 261 also includes means, such as a pair of interconnected stepped shifting gears 339, 341 selectively movable between a plurality of shifted positions with respect to idler shafts 311, 315 and operable generally in one of the shifted positions (as best seen in FIG. 21) for coupling idler shaft 315 with tubular output shaft 293 and in another of the shifted positions thereof (as best seen in FIG. 22) for coupling idler shaft 315 with idler shaft 311. A splined bore 343 is coaxially provided through coupling means or stepped shifting gears 339, 341, and splines 335 on idler shaft 315 are cooperatively received in the splined bore so that the stepped shifting gears are axially movable between at least the upper shifted or spin position and the lower shifted or agitating position thereof on idler shaft 315. As discussed hereinafter, stepped shifting gears 339, 341 may also be provided with a third shifted position, such as a neutral or pump operating position, disengaged from output shafts 293, 303. Thus, through the engagement of splines 335 on idler shaft 315 with splined bore 343 of stepped shifting gears 339, 341, the stepped shifting gears are not only axially movable or shiftable on idler shaft 315 but also conjointly rotatable therewith in response to the rotation of input shaft 287. Larger stepped shifting gear 341 is arranged in meshing engagement with output gear 301 on tubular output shaft 293 when stepped shifting gears 339, 341 are in the upper shifted position thereof, and smaller shifting gear 339 is arranged in meshing engagement with intermediate pinion gear 337 on idler shaft 311 when the stepped shifting gears are in the lower shifted position thereof. To complete the description of transmission mechanism 245, a shift actuating device, schematically shown and indicated generally at 345, is selectively operable for moving a linkage 347 thereof to effect the shifting axial movement of stepped shifting gears 339, 341 connected with the leakage between the shifted positions of the stepped shifting gears on idler shaft 315; however, while the shift actuating device and linkage are illustrated herein in association with stepped shifting gears 339, 341, for purposes of disclosure, it is contemplated that other means may be employed for effecting the shifting of the stepped shifting gears between the shifted positions thereof, i.e., shifting transmission mechanism 245 between its aforementioned operating modes, within the scope of the invention so as to meet at least some of the objects thereof.

With respect to the operation of transmission device 245, it will be recalled that input shaft 287 may be driven or operated so as to be oscillatable in one operating mode of the transmission mechanism and unidirectionally rotated in another operating mode of the transmission mechanism. When input shaft 287 is unidirectionally rotated, linkage 347 is actuated by shifting device 345 so that stepped shifting gears 339. 341 are in the upper shifted position thereof (as best seen in FIG. 21) wherein larger stepped shifting gear 341 is meshed with output gear 301 of tubular output shaft 293. In this manner, unidirectional rotation of input shaft 287 is transmitted through meshed input gear 291 and pinion gear 317 to idler shaft 315 to effect the conjoint unidirectional rotation thereof with the input shaft. Since splines 335 on idler shaft 315 are received in splined bore 383 of stepped shifting gears 339,341, the stepped shifting gears are conjointly unidirectionally rotated with idler shaft 315, and this conjoint unidirectional rotation of the shifting gears is transmitted through meshed larger stepped shifting gear 341 to output gear 301 on tubular output shaft 293 so as to effect the conjoint unidirectional rotation thereof with the stepped shifting gears. Thus, in the one operating mode of transmission mechanism 245 as determined by shifting device 345, the unidirectional rotation of input shaft 287 is transmitted to tubular output shaft 293 effecting the conjoint unidirectional rotation thereof with the input shaft while output shaft 303 remains at rest.

When linkage 347 is actuated by shifting device 345 so as to axially move stepped shifting gears 339, 341 downwardly toward its lower shifted position on idler shaft 315 (as best seen in FIG. 22), larger stepped shifting gear 341 is disengaged from output gear 301 on tubular output shaft 293, and smaller stepped shifting gear 339 is moved into meshing engagement with intermediate pinion gear 337 on idler shaft 311. With stepped shifting gears 339, 341 in their lower shifted position, transmission mechanism 245 may function in its another operating mode with input shaft 287 being oscillatably rotatable. Thus, the oscillation of input shaft 287 is transmitted through meshed input gear 291 and pinion gear 317 to idler shaft 315 to effect the conjoint oscillation thereof with the input shaft. Since splined bore 343 of stepped shifting gears 339, 341, is received on splines 335 of idler shaft 315, the stepped shifting gears are conjointly oscillated with idler shaft 315, and such conjoint oscillation is transmitted to idler shaft 311 through the meshing engagement of smaller stepped shifting gear 339 with intermediate gear 337 on idler shaft 311. This conjoint oscillation of idler shaft 311 with idler shaft 315 is transmitted to output shaft 303 through the meshing engagement of pinion gear 313 on idler shaft 311 with output gear 309 on output shaft 303. Thus, the oscillation of input shaft 287 is transmitted to output shaft 303 during the another operating mode of transmission mechanism 345.

In the foregoing description of transmission mechanism 245, casing 249 may contain a suitable lubricant (not shown) for lubricating the components and bearing means thereof; however, it is contemplated that at least the various gears of such components may be formed from a resin material within the scope of the invention so as to meet at least some of the objects thereof, and if so, then the casing and the lubricant may be omitted, and such bearing means may be of the self-lubricated type.

Figure 25:
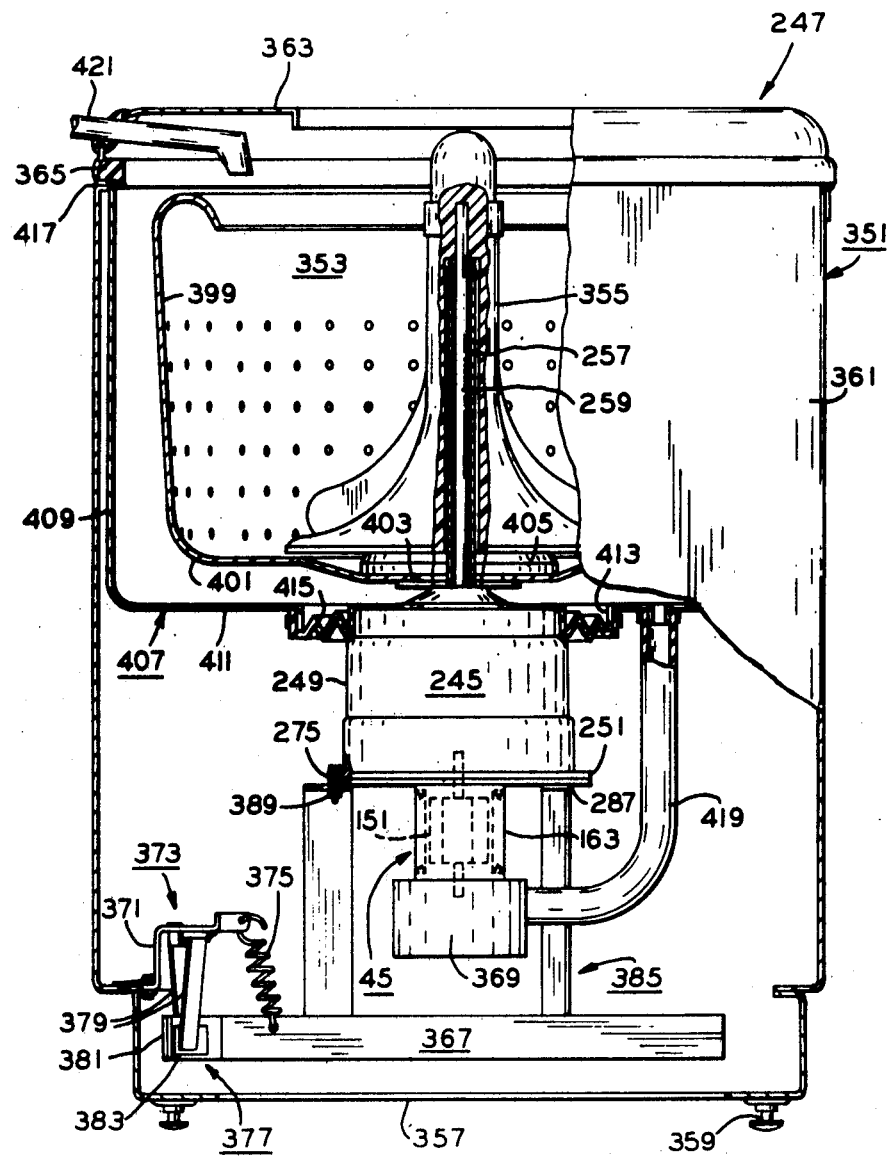
FIG. 25 is a partial sectional view illustrating a laundry machine as well as a drive therefor.

With reference again to the drawings in general and recapitulating at least in part with respect to the foregoing, laundry or clothes washing machine 247 has a cabinet 351, and means, such as a perforate spin tub 353 or the like for instance, arranged within the cabinet for receiving water and clothes (not shown) to be laundered therein is adapted to be unidirectionally rotatable at a velocity great enough to centrifugally displace at least some of the water from the clothes to be laundered therein (FIG. 25). Means, such as an agitator 355 or the like for instance, arranged within receiving means or spin tub 353 so as to be generally coaxial therewith is adapted to be oscillated, i.e., rotated in opposite directions, for agitating the clothes in the water to effect the laundering thereof (FIG. 25). Electronically commutated motor 45 mounted within cabinet 351 has stationary assembly 163 with winding stages 171, 173, 175 wound therein and adapted to be commutated so as to be excited or energized in at least one preselected sequence and in at least one of preselected different sequences (FIGS. 16–19, 25 and 26). Rotatable assembly 151 is arranged with stationary assembly 163 in magnetic coupling relation with winding stages 171, 173, 175, and the rotatable assembly is oscillated upon the energization of the winding stages in the at least one preselected different sequences and also unidirectionally rotated upon the energization of the winding stages in the at least one preselected sequence (FIGS. 16–19, 25 and 16). Transmission mechanism 245 is adapted to be operatively connected with each of spin tub 353 and agitating means or agitator 355 for transmitting the oscillation movement of rotatable assembly 165 to the agitator so as to effect the conjoint oscillation movement thereof with the rotatable assembly and for transmitting the unidirectional rotation of the rotatable assembly to the spin tub so as to effect the conjoint unidirectional rotation thereof with the rotatable assembly, respectively (FIGS. 21–26). Input shaft 287 of transmission mechanism 245 is constituted by shaft 155 of rotatable assembly 151 (FIG. 25).

More particularly and with specific reference to FIGS. 25 and 26, cabinet 351 of laundry machine 247 has a base 357 with a plurality of adjustable or leveling support feet 359 thereon. An outer or upper cabinet structure 361 has the lower end portion thereof supported on or otherwise connected to base 357 by suitable means, and the upper end portion of the upper cabinet structure supports or is otherwise connected with a cover 363 therefor. Sealing means, such as a resilient gasket 365 or the like for instance, is sealably fitted or otherwise interposed between the upper end portion of cabinet structure 361 and cover 363.

Laundry machine 247 is provided with a supporting frame 367 on which transmission mechanism 245, electronically commutated motor 45, a pump device 369 for the laundry machine, spin tub 353 and agitator 355 are supported generally in vertically aligned or in-line relation, as discussed hereinafter. Frame 367 is suspended or otherwise mounted within cabinet 351 on a plurality of brackets 371 suitably attached to base 357 by a plurality of damping means 373; however, for the sake of drawing simplicity only one of such bracket and damping means is shown in FIG. 25. Each vibration damping means 373 has resilient means, such as a coil spring 375 or the like for instance, biased or otherwise interconnected between bracket 371 and frame 367, and other resilient means, such as a generally U-shaped spring clamp 377 or the like for instance, is secured to the bracket having a pair of depending prestressed legs 379 straddling a part 381 of the frame in gripping engagement therewith with resilient friction pads 383 interposed between the legs and the frame part, respectively. Thus, vibration damping means 373 acts not only to limit or damp twisting or torquing movement but also vertical movement of frame 367 which may be imparted thereto particularly during the spin cycle or operating mode of laundry machine 247, as discussed hereinafter.

A platform or other upstanding structure 385 is generally centrally provided on frame 367 and integrally connected thereto by suitable means (not shown), and lower end wall 251 on casing 249 of transmission mechanism 245 is seated on an upper free end or seat 287 of the platform being connected thereto by suitable means, such as a plurality of nuts and bolts 389 or the like for instance, arranged with mounting openings 275 in the lower end wall and aligned mounting openings 391 in the platform as best seen in FIG. 26. Further with respect to FIG. 26, it may be seen that end shield 215 of electronically commutated motor 45 is removed from housing 213 thereof, and flange 223 of housing sleeve 219 is abutted against lower end wall 251 of transmission mechanism casing 249 being secured by suitable means, such as a plurality of nuts 393 or the like for instance, threadedly received on stud plurality 285 extending from the lower end wall. Thus with electronically commutated motor 45 mounted to transmission mechanism 245 so as to depend therefrom through platform 385 toward frame 367, shaft extension 157 on rotatable assembly shaft 151 in electronically commutated motor 45 is journaled in bearing means 281 disposed in lower end wall 251 of transmission mechanism casing 249 so as to constitute input shaft 287 of the transmission mechanism, and of course, input gear 291 is mounted on the free end of shaft extension 157 so as to be conjointly rotatable with rotatable assembly 151 of the electronically commutated motor upon the energization thereof. The other end shield 217 of electronically commutated motor 45 may also be removed so that flange 225 of housing sleeve 219 is abutted against pump 369, and the other shaft extension 159 of rotatable assembly 151 extends into driving engagement with the pump of laundry machine 247. Pump 369 is secured to flange 225 of electronically commutated motor 45 by suitable means, such as a plurality of nuts 395 or the like for instance, threadedly received on a stud plurality 397 extending from the pump. While the aforementioned mounting arrangements or interconnections of transmission mechanism 245 to platform 385, electronically commutated motor 45 to the transmission mechanism, and pump 369 to the electronically commutated motor have been illustrated herein for the purposes of disclosure, it is contemplated that various other mounting arrangements or interconnections may be made between such components of laundry machine 247 within the scope of the invention so as to meet at least some of the objects thereof.

With reference again to FIG. 25, spin tub 353 includes a generally annular perforate sidewall 399 having a base wall 401 integrally interconnected therewith, and a generally central opening 403 extends through the base wall. Means, such as a collar 405 or the like for instance, is provided for securing spin tub 353 to tubular output shaft 293 of transmission mechanism 245, and the securing means or collar extends through opening 403 in spin tub base wall 401 being grippingly and sealably engaged with the opposite sides thereof generally about the opening. Albeit not shown, the tubular output shaft 293 extending exteriorly of transmission mechanism casing 249 is connected by suitable means with collar 405 so that spin tub 353 is conjointly unidirectionally rotatable with the tubular output shaft during the spin cycle of laundry machine 247, as discussed hereinafter. Further upper end 305 of output shaft 303, which extends exteriorly of transmission mechanism casing 249 and coaxially through tubular output shaft 293, is connected by suitable means (not shown) with agitator 355 so that the agitator is conjointly oscillated with output shaft 303 during the agitation cycle or operating mode of laundry machine 247, as also discussed hereinafter.

An intermediate or enclosing tub 407 is provided with a sidewall 409 spaced generally between spin tub sidewall 399 and upper cabinet structure 361, and a base wall 411 is integrally formed with the enclosing tub sidewall having a generally centrally located opening therethrough defined by an integral generally annular flange 413 depending from the base wall in spaced relation generally adjacent casing 249 of transmission mechanism 245. Sealing means, such as a resilient annular boot 415 or the like for instance, is sealably interconnected or otherwise interposed between flange 413 on enclosing tub 407 and casing 249 of transmission mechanism 245, and another generally annular flange 417 integrally formed on enclosing tub sidewall 409 about the free or upper end thereof extends into supporting engagement with the upper end portion of upper cabinet structure 361 and sealing engagement with gasket 365 extending thereabout. To complete the description of laundry machine 247, conduit means, such as a hose 419 or other flexible connection for instance is connected between base wall 411 of enclosing tub 407 and pump 369 providing a passage for the removal from the enclosing tub of water selectively discharged into spin tub 353 through a nozzle 421.

In the operation of laundry machine 247, assume that stepped shifting gears 339, 341 in transmission mechanism 245 are disposed in the lower shifted or agitation position thereof with smaller stepped shifting gear 339 driving output shaft 303 through the meshing engagement of the smaller shifting gear with intermediate gear 337 on idler shaft 311 and the meshing engagement of pinion gear 313 thereon with output gear 309 on the output shaft, as discussed hereinabove with respect to FIGS. 21-24. With transmission mechanism 245 so set or shifted to effect the agitation cycle or operating mode of laundry machine 247, water may be introduced through nozzle 421 into spin tube 353 so that it flows through the perforations therein into enclosing tub 407, and clothes to be laundered in the water and a charge of detergent or the like (not shown) may also be placed in the spin tub. Of course, the level to which the water rises in enclosing tub 407 may be controlled by any suitable fluid level sensing means, as well known in the art. With this preparation, electronically commutated motor 45 may be energized to commence the wash or agitation cycle of laundry machine 247. Upon the energization of electronically commutated motor 45, winding stages 171, 173, 175 of the electronically commuted motor are commutated so as to be excited in the aforementioned preselected different sequences which effects the magnetic coupling therewith of rotatable assembly 151 so as to impact oscillating movement or rotation to the rotatable assembly. Of course, as previously mentioned, this oscillating rotation of rotatable assembly 151 may be of any desired or preselected speed depending upon the frequency of the commutation of winding stages 171, 173, 175 and also of any desired or preselected amplitude depending upon the time or number of cycles the frequency is applied to the winding stages. The oscillating rotation of rotatable assembly 151 is translated or transmitted by transmission mechanism 245 to its output shaft 303 which is drivingly connected or otherwise associated with agitator 355 so as to effect the conjoint oscillation thereof with the rotatable assembly of electronically commutated motor 45. In this manner, the oscillatory movement of agitator 355 within spin tub 353 effects the agitation and laundering of the clothes therein. Albeit not shown for purposes of brevity, pump 369 may include means for pumping water from enclosing tub 407 through a filter back into spin tube 353 in order to trap or filter out much of the lint which may be separated from the clothes as they are laundered during the above discussed agitation cycle of laundry machine 247. After laundry machine 247 has been operated for a desired or preselected period of time in its agitation cycle, electronically commutated motor 45 may be de-energized so as to terminate such agitation cycle.

Subsequent to the agitation cycle of laundry machine 247 and in order to initiate the spin cycle thereof, shifting device 345 for transmission mechanism 245 may be actuated causing its linkage 347 to move stepped shifting gears 339, 341 upwardly on idler shaft 315 toward the spin or upper shifted position thereof, as shown in FIG. 21, so that larger stepped shifting gear 341 is meshed with output gear 301 on tubular output shaft 293. At this time, electronically commutated motor 45 may be reenergized with its winding stages 171, 173, 175 commutated so as to be excited in a preselected sequence which effects the magnetic coupling therewith of rotatable assembly 151 in the manner discussed hereinbefore to impart unidirectional rotation to the rotatable assembly. As previously mentioned, the unidirectional speed of rotational assembly 151 may be of any desired or preselected speed depending upon the the frequency with which winding stages 171, 173, 175 of electronically commutated motor 45 are commutated in the preselected sequence during the spin cycle of laundry machine 247; however, it is contemplated that the speed of the unidirectional rotation of the rotatable assembly will be appreciably greater than the speed of the above discussed oscillation rotation of the rotatable assembly. With stepped shifting gears 339, 341, moved into the upper shifted position thereof in transmission mechanism 245, as discussed above, the unidirectional rotation of rotatable assembly 151 is translated or transmitted by the transmission mechanism to its tubular output shaft 293 which is drivingly connected or otherwise associated with spin tub 353 so as to effect the conjoint unidirectional rotation thereof with the rotatable assembly of electronically commutated motor 45. In this manner, the unidirectional rotation of spin tub 353 is operative to effect the centrifugal displacement of water from the clothes within the spin tub, and of course, pump 369 may, if desired, be arranged to be driven by electronically commutated motor 45, as discussed hereinafter, and includes means for effecting the removal of water from the spin tub and enclosing tub 407 through hose 419 to a drain (not shown). After laundry machine 247 has been operated for a desired or preselected period of time in its spin cycle, electronically commutated motor 45 may be de-energized so as to terminate such spin operating mode.

To complete the operation of laundry machine 247, shifting device 345 may be selectively actuated to operate linkage 347 and move stepped shifting gears 339, 341 to the neutral position thereof, as previously mentioned, to effect a pumping cycle or mode of operation of the laundry machine. In their neutral position, stepped shifting gears 339, 341 are disengaged from output gear 301 on tubular output shaft 293 and from intermediate gear 337 on idler shaft 311 which is drivingly connected with through its gear 313 with output gear 309 on output shaft 303. Therefor, with stepped shifting gears 339, 341 in their neutral position, electronically commutated motor 45 may be energized to drive pump 369 while being, in effect, drivingly disconnected from spin tub 353 and agitator 355 by transmission mechanism 245.

It will be understood that while the above description of laundry machine 247 does not illustrate all of the valving and particular controls normally provided on modern domestic laundry machines, the omission and/or simplification of these components is primarily for the purposes of brevity; however, it is contemplated that such components may be provided in the laundry machine and that such laundry machine may be provided with other operating modes or cycles within the scope of the invention so as to meet at least some of the objects thereof.

With reference again in general to the drawings and recapitulating with respect to the foregoing, it may be noted that a drive is provided for laundry machine 247 (FIGS. 13-20 and 21-26). In this drive, transmission mechanism 245 has input means 255 adapted for both oscillating and unidirectional rotation, and coaxially arranged output means 257, 259 of the transmission mechanism are adapted for selective driven connection with the input means so as to be conjointly rotatable therewith, respectively (FIGS. 21-26). Electronically commutated motor 45 is associated in mounting relation with transmission mechanism 245 and includes rotatable assembly 151 connected generally in aligned and direct driving relation with the transmission so as to comprise the input means 255 thereof (FIGS. 25 and 26). Electronically commutated motor 45 further includes multistage winding arrangement 167 with each winding stage 171, 173, 175 thereof being selectively energizable to effect both oscillation and unidirectional rotation of rotatable assembly 151 thereof (FIGS. 13-20).

Figures 27, 28:
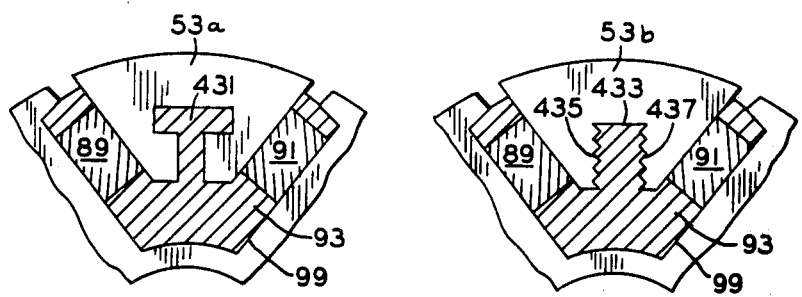
FIGS. 27 and 28 are partial sectional views illustrating alternative pole sections which may be utilized in the lamination of FIG. 1, the rotatable assembly of FIGS. 9-11 and the method of making such in FIGS. 2-8 in one form of the invention, respectively.

Referring now to FIGS. 27 and 28, alternative pole sections 53a and 53b are shown assembled in rotor 43 by generally the same method of making the rotor as discussed hereinabove and having generally the same component parts functioning in generally the same manner as the previously discussed pole section 53 with the following exceptions; however, while pole sections 53a and 53b may meet at least some of the objects set out hereinabove, it is believed that pole sections 53a and 53b also have indigenous objects and advantageous features which will be in part apparent and in part pointed out in the following discussion.

In pole sections 53a of FIG. 27, a generally T-shaped opening 431 is provided therethrough in which hardenable material 93 is received and solidified when provided in slots 99 of rotor 43 or otherwise introduced thereinto, as previously discussed with respect to the method of making the rotor and as indicated in functional diagram box 133 of FIG. 2. Thus, the abutment of hardenable material 93 with flanges 141, 143 of pole sections 49 and the coaction of the hardenable material with T-shaped opening 431 in pole sections 53a serves to retain both the pole sections 53a and magnets 89, 91 against displacement from the preselected or located positions thereof within rotor slots 99. It may be noted that seats 83, 85 provided on the previously discussed pole section 53 for seating abutment with magnets 89, 91 may be omitted from pole section 53a due to the retaining relationship of T-shaped opening 431 thereof with hardenable material 93 in rotor slots 99. While T-shaped opening 431 in pole section 53a is shown for purposes of disclosure, it is contemplated that other shaped openings may be provided in other pole sections for the retaining relationship with hardenable material 93 in rotor slots 99 within the scope of the invention so as to meet at least some of the objects thereof. Of course, one of those contemplated openings is shown at 433 in pole section 53b of FIG. 28. In opening 433, opposed serrations 435, 437 are provided on pole sections 53b in generally the same retaining relation with hardenable material 93 in rotor slots 99 as discussed above with respect to pole sections 53a.

Referring now to FIGS. 29-32, there is disclosed an alternative rotatable assembly 451 for use in electronically commutated motor 45 and also an alternative method of making, manufacturing or assembling a core or rotor 453 in one form of the invention which may be utilized in the rotatable assembly. This alternative method and rotatable assembly 451 utilizes generally the same component parts arranged so as to function generally in the same manner as the previously discussed method and rotatable assembly 151 with the exceptions discussed hereinafter; however, while this alternative method and rotatable assembly 451 may meet at least some of the objects set out hereinabove, it is believed that the alternative method and rotatable assembly 451 also have respective indigenous objects and advantageous features which will be in part apparent and in part pointed out in the following discussion.

Figure 29:
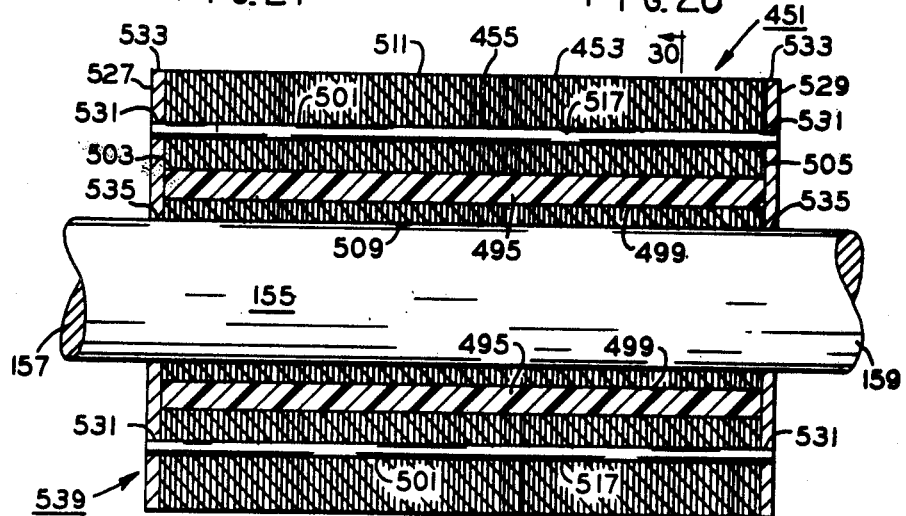
FIG. 29 is an elevational view partially in section illustrating an alternative rotatable assembly which may be utilized with the stationary assembly in the electronically commutated motor of FIGS. 15-19.
Figure 30:
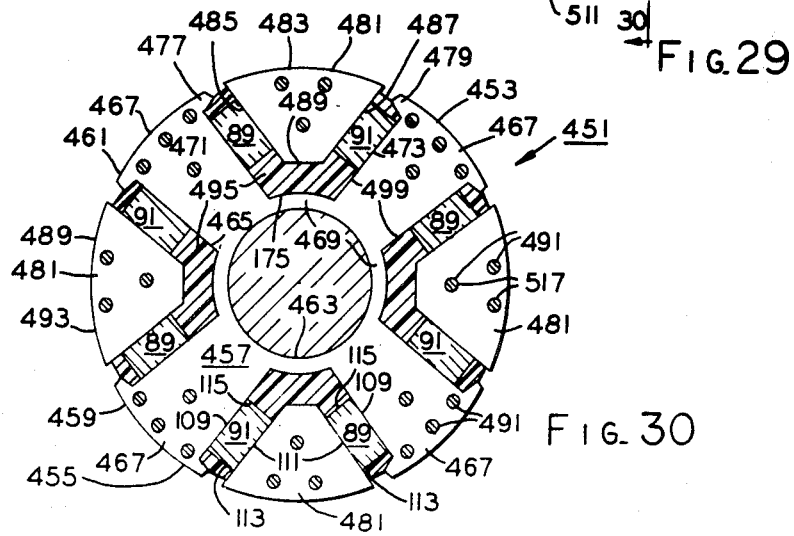
FIG. 30 is a sectional view taken along lines 30—30 in FIG. 29.

With reference to FIGS. 29 and 30, rotor 453 includes a stack 455 of laminations 457 arranged generally in juxtaposed or face-to-face relation in a desired stack length or height. Each lamination 457 has a unitary body 459 of generally thin ferromagnetic material, and a pair of radially spaced outer and inner peripheral edges 461, 463 are provided on the body with the inner peripheral edge defining a shaft receiving opening. A plurality of openings, such as generally U-shaped or V-shaped apertures or slots 465 for instance, are provided through body 459 intersecting with outer peripheral edge 461, and the openings are arranged with each other in generally arcuate spaced relation about the body. Thus, a plurality of pole sections 467 are respectively defined on body 459 between adjacent ones of openings 465 so as to extend between outer and inner peripheral edges 461, 463, and a plurality of means, such as inner peripheral bridges or connecting arms 469 for instance, on the body are interposed or otherwise integrally interconnected between adjacent ones of pole sections 467 for bridging therebetween generally adjacent the inner peripheral edge.

As previously mentioned, each of openings 465 intersect with outer peripheral edge 461, and the openings include a pair of opposed side edges 471, 473 extending generally in converging relation with respect to each other between outer and inner peripheral edges 461, 463 with an end edge 175 interconnected between the opposed side edges and spaced generally adjacent the inner peripheral edge. Thus, bridges 469 are defined on body 459 generally between end edge 475 of openings 465 and inner peripheral edge 463, and pole sections 467 are defined on the body generally between opposite ones of side edges 471, 473 of adjacent openings 465, respectively. A pair of opposed extensions or flanges 477, 479 are integrally provided on adjacent ones of pole sections 467 at least adjacent outer peripheral edge 461 and the flanges extend into openings 465 past opposed side edges 471, 473 thereof. While openings 465 are described herein as being generally V-shaped, it is contemplated that other openings having various other shapes may be employed in other laminations within the scope of the invention so as to meet at least some of the objects thereof.

A plurality of other pole sections 481 may be formed from generally the same ferromagnetic material as that of lamination body 459, and each of pole sections 481 is generally V-shaped so as to generally correspond to or fit within openings 465, as discussed in greater detail hereinafter. Pole sections 481 include a generally arcuate edge 483 formed so as to have generally the same radius of curvature as outer peripheral edge 461 on lamination body 459, and the arcuated edge interconnects between one of the ends a pair of opposite side edges 485, 487 on pole section 481, respectively. Opposite side edges 485, 487 extend generally convergently from arcuate edge 483, and the other of the ends of the opposite side edges are interconnected with free end edge 489 which is generally opposite arcuate edge 483. To complete the description of laminations 457 and pole sections 477, a plurality of amortisseur winding receiving apertures 491 are provided through the laminations and the pole sections.

Figure 31:
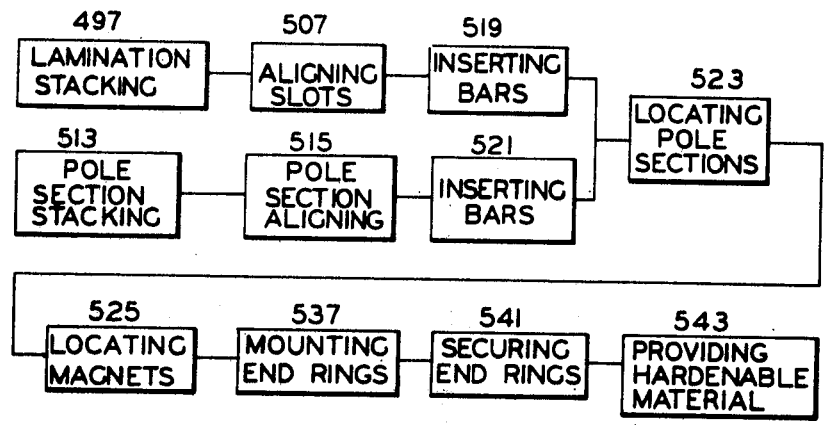
FIG. 31 is a functional box diagram illustrating a method of making a core for use in the rotatable assembly of FIG. 29.
Figure 32:
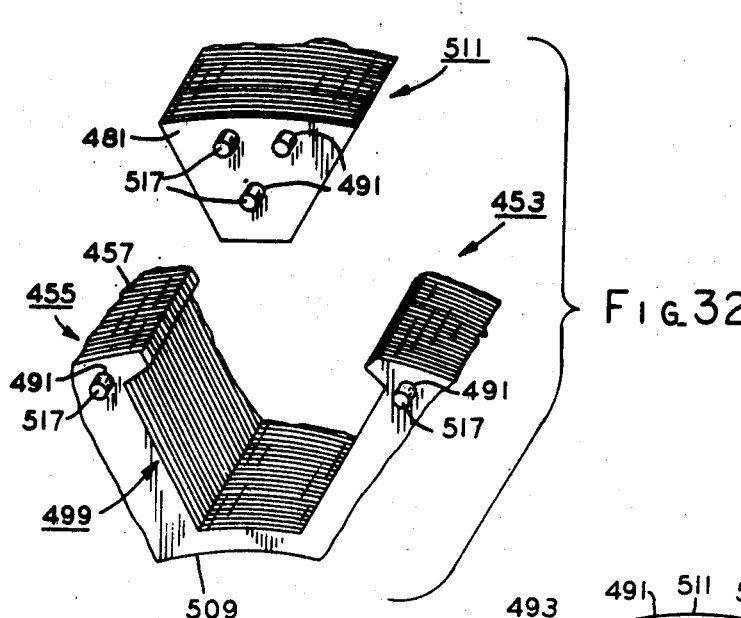
FIGS. 32 and 33 are enlarged partial views of the core of FIGS. 29 and 30 and illustrate principles which may be practiced in the method represented by the functional box diagram of FIG. 31.
Figure 33:
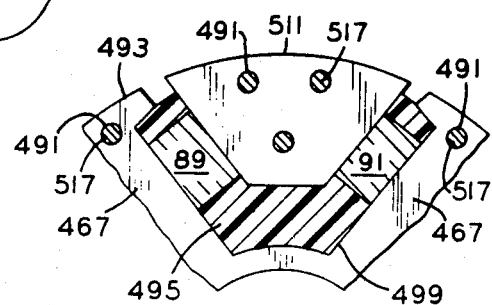

With reference in general to FIGS. 29–32 and recapitulating at least in part with respect to the foregoing, there is illustrated in one form of the invention a method of making, manufacturing or assembling rotor or core 453, and the rotor has a plurality of discrete polar regions or areas, such as generally defined by pole sections 467 for instance, with such polar regions or pole sections being spaced apart generally about a peripheral portion 493 of the rotor (FIGS. 29, 30 and 32). In this method, a plurality of other discrete polar regions or areas, such as defined by pole sections 481 for instance, are positioned or otherwise placed or located in preselected positions between adjacent ones of pole sections 467, and a plurality of sets of magnetic material elements, such as magnets 89, 91 for instance are disposed or otherwise arranged between pole sections 481 and the pole section 477 adjacent thereto, respectively (FIGS. 30 and 32). A hardenable nonmagnetic material 495 is solidified in place in rotor 453 between pole sections 467, 481 and magnets 89, 91 so as not only to effect magnetic polarity definition between pole sections 467 and pole sections 481 but also to retain pole sections 481 against displacement from the preselected positions thereof, respectively (FIG. 33). While hardenable nonmagnetic material 495 as discussed above is disclosed as a resin material, it is contemplated that other hardenable nonmagnetic materials, such as aluminum, copper or alloys thereof for instance, may be employed in the method of making rotor 453 within the scope of the invention so as to meet at least some of the objects thereof.

More particularly and with specific reference to FIGS. 29–32, a plurality of laminations 457 are stacked or otherwise assembled together generally in juxtaposed or face-to-face relations thereby to form lamination stack 455, as shown in FIG. 29, and such stacking of the laminations is illustrated by functional diagram box 497 in FIG. 31. Either during or subsequent to the above discussed stacking of laminations 457 into rotor stack 455, openings 465 and apertures 491 of each of the laminations are respectively aligned or otherwise arranged or located with respect to each other so that such aligned openings define a plurality of slots or slot openings 499 and so that such aligned apertures define a plurality of amortisseur winding receiving opening or bores 501 which extend across or through rotor stack 455 between a pair of opposite ends or end faces 503, 505 thereof, respectively. Even though the alignment of openings 465 and apertures 491 so as to respectively form slots 499 and bores 501 may be accomplished during the stacking of laminations 457, as discussed above, such alignment is illustrated in a separate functional diagram box 507 in FIG. 31 for purposes of clarity. Further, albeit not shown for the sake of brevity, it is understood that suitable equipment may be employed to effect the stacking of laminations 457 and the alignment of openings 465 and apertures 491, as discussed above. Of course, it may also be noted that upon the alignment of openings 465 and apertures 491, outer and inner peripheral edges 461, 463 of laminations 457 in stack 455 thereof are also generally aligned or otherwise arranged with each other so that the outer peripheral edges define in part peripheral portion or wall 493 on rotor 453 between opposite ends 503, 505 thereof and inner peripheral edges 463 generally define a shaft receiving bore 509 extending through the rotor between the opposite end thereof, respectively, as best seen in FIG. 29. The particular edges on laminations 457 which define openings 465 therethrough, as discussed above, are also disposed generally in alignment with each other upon the alignment of the openings so as to form slots 499 in rotor stack 455, and such particular edges in their aligned formation define walls or wall means of the slots; however, for the sake of brevity, such slot walls will be designated by the reference numerals of such particular edges corresponding thereto when referred to hereinafter.

Either before, after or simultaneously with the above discussed stacking of laminations 257 and the alignment of openings 465 so as to define rotor slots 499, a plurality of pole sections 481 may also be stacked or otherwise assembled together generally in juxtaposed or face-to-face relations thereby to form a plurality of stacks 511 thereof, as best seen in FIGS. 29 and 32, with the pole section stacks having generally the same stack lengths or heights as lamination stack 455. Of course, either during such stacking of pole sections 481 or subsequent thereto, the particular edges on the pole sections are respectively aligned with each other so as to define walls or wall means on the pole section stack 511; however, for the sake of brevity, such pole section walls will be designated by the reference numerals of such particular edges corresponding thereto when referred to hereinafter. When the particular edges of pole sections 481 are so aligned, apertures 491 extending therethrough are also aligned with each other so as to define other amortisseur winding receiving bores 501 through pole sections stacks 511. Since the stacking and aligning of pole sections 481 may occur before, after or simultaneously with the stacking of laminations 457, as previously mentioned, the pole section stacking and aligning are respectively illustrated by functional diagram boxes 513 and 515 in FIG. 31 in parallel flow relation with box 493 which illustrates the lamination stacking. Albeit not shown for the purpose of brevity, it is understood that suitable equipment may be employed to effect the stacking and alignment of pole sections 481 into stacks 511 thereof.

Subsequent to the stacking and aligning of laminations 457 and pole sections 481, as discussed above, a plurality of amortisseur winding bars 517 of a nonmagnetic material yet having good electrical conductivity properties, such as aluminum, copper or alloys thereof for instance, may be inserted or otherwise placed or located in bores 501 extending through both lamination stack 455 and pole section stack 511, as best seen in FIGS. 29 and 32. Of course, the insertion of bars 517 through lamination stack 455 and pole section stacks 511 may occur simultaneously or one before the other, as desired; therefore, the insertion of the bars into the lamination stack and the pole section stacks are respectively illustrated in functional diagram boxes 519 and 521 in parallel flow relation with each other in FIG. 31. While bars 517 are disclosed herein as being inserted into bores 501 of both lamination stack 455 and pole section stack 511 subsequent to the respective stacking and aligning thereof, it is contemplated that the bores of both the laminations 457 and pole sections 477 may be assembled directly onto or about the bars arranged in predetermined positions so as to accommodate the stacking and alignment of the laminations and the pole sections thereon within the scope of the invention so as to meet at least some of the objects thereof. Of course, it is also contemplated that suitable equipment and/or fixtures (not shown) may be utilized to effect the placement of bars 517 with respect to bores 501 in lamination stack 457 and pole section stacks 511, respectively.

With bars 517 so placed in lamination stack 457 and pole section stacks 511, the pole section stacks may be disposed, placed or otherwise located within slots 499 of lamination stack 455 in preselected positions therein. In these preselected positions, it may be noted that opposite sidewalls 485, 487 of pole sections stacks 511 are arranged generally in opposed facing relations with opposed sidewalls 471, 473 on adjacent ones of pole sections 467 on the lamination stack, and arcuate walls 483 of the pole section stacks are arranged so as to generally define in part peripheral portion 493 of rotor 453 or at least be generally coextensive therewith. Of course, free end walls 489 of pole section stacks 511 are disposed in spaced relation opposite end walls 475 of lamination stack 455 when the pole section stacks are in their respective preselected positions. The disposition of pole section stacks 511 in their respective preselected positions is illustrated by functional diagram box 523 in FIG. 31.

Either before, after or simultaneously with the placement of pole section stacks 511 in their preselected positions, as discussed above, sets of magnets 89, 91 may also be disposed, placed or otherwise located in preselected positions between opposite sidewalls 185, 187 of the pole section stacks and opposed sidewalls 171, 173 of pole sections 467 on lamination stack 455 adjacent the pole section stacks, respectively. Albeit desirable to abut opposite sidewalls 185, 187 of pole section stack 511 and opposite faces 109 of the magnets with opposed sidewalls 171, 173 of pole sections 467 on lamination stack 455, it is believed that the magnets may be generally loosely disposed therebetween, i.e., with respect to the manufacturing tolerances of the magnets, the pole section stack and the lamination stack, respectively. Of course, it is contemplated that suitable equipment and/or fixturing may be employed to provide for the location of pole section stacks 511 and magnets 89, 91 either simultaneously or in any order about rotor 453. Even though magnets 89, 91 may be located in their respective preselected positions either before, after or simultaneously with the placement of pole section stacks 511 in their respective preselected positions, as previously mentioned, the location of the magnets is illustrated for purpose of clarity in functional diagram box 525 in FIG. 31 separate from box 523 which illustrates the location of the pole section stacks. If laminations 457 and pole sections 481 are assembled into respective stacks 455 and 511 thereof on bars 517, as contemplated and previously mentioned hereinabove, it is further contemplated that magnets 89, 91 may be assembled with the respective stacks while they are mounted on the bars within the scope of the invention so as to meet at least some of the objects thereof.

Subsequent to the location of magnets 89, 91 with respect to lamination stack 455 and pole section stack 511, as discussed above, a pair of end rings 527, 529 are positioned or otherwise mounted generally in face-to-face relation with opposite end faces 503, 505 of the lamination stack and on the opposite ends of bars 517 extending through bores 501 in both pole section stacks 511 and the lamination stack past the end faces thereof, respectively. End rings 527, 529 are formed of a nonmagnetic material having acceptable electrical conductivity properties, such as aluminum, copper or alloys thereof for instance, and a plurality of apertures 531 are provided through the end rings generally in alignment with bores 501 in both lamination stack 455 and pole section stacks 511 so as to receive the opposite ends of bars 517 when the end rings are mounted thereto, respectively. End rings 527, 529 are respectively provided with generally radially spaced outer peripheral edges 533 and inner peripheral edges 535, and the outer peripheral edges are disposed at least adjacent peripheral portion 493 of rotor 453 while the inner peripheral edges are disposed at least adjacent shaft receiving bore 509 of the rotor. The mounting of end rings 527, 529, as discussed above, is illustrated by functional diagram box 537 in FIG. 31, and of course, it is also contemplated that suitable equipment and/or fixturing (not shown) may be employed to effect the mounting of the end rings.

With opposite ends of bars 517 so received in apertures 531 of end rings 527, 529, the bars and end rings are secured together in displacement preventing engagement and electrical contacting engagement by suitable means, such as soldering or the like for instance, thereby to form amortisseur winding 539 in rotor 453; however, it is contemplated that other means may be employed to effect the securement of the bars and the end rings within the scope of the invention so as to meet the objects thereof. The securement of end rings 527, 529 to bars 517, as discussed above, is illustrated by functional diagram box 541 in FIG. 31.

When end rings 527, 529 are so mounted in caging relation with lamination stack 455 and pole section stacks 511 and secured to the opposite ends of bars 517, as previously discussed, hardenable nonmagnetic material 495 is provided or otherwise introduced into slots 499 of lamination stack 455 between the end rings so as to fill the interstices within the slots between pole section stacks 511, pole sections 467 on the lamination stack and magnets 89, 91 disposed therebetween, as best seen in FIG. 33 and as illustrated by functional diagram box 543 in FIG. 31. As previously mentioned, upon the solidification of hardenable material 495 in slots 499, the hardenable material and magnets 89, 91 define the magnetic polarity of pole section stacks 511 from that of pole sections 467 on lamination stack 455, and since the hardenable material is engaged between opposite faces 113 of the magnets and flanges 477, 479 on the lamination stack, the hardenable material also serves to maintain or retain the magnets in their preselected positions against displacement therefrom respectively. It is also believed that the hardenable material may assist the amortisseur winding 539 in retaining pole section stacks 511 against displacement from their respective preselected positions in slots 499.

To complete the method of making rotor 453, peripheral portion 493 thereof may be turned or otherwise machined so as to provide the rotor with a preselected outside diameter generally in the same manner as discussed hereinabove with respect to the machining of rotor 43.

Upon the completion of rotor 453, bore 509 thereof may be mounted in gripping or displacement preventing engagement with shaft 155 generally in the same manner as discussed hereinbefore with respect to rotor 43. Thus, rotor 453 and shaft 155 comprise rotatable assembly 451 which is mounted on otherwise arranged with stationary assembly 161 of electronically commutated motor 45 so as to be operable therewith generally in the same manner as discussed hereinbefore with respect to rotatable assembly 151. Of course, it is also contemplated that magnets 89, 91 in rotatable assembly 451 may be magnetized in the same manner as previously discussed hereinabove.

From the foregoing, it is now apparent that a novel stationary assembly 161 has been presented meeting the objects set out hereinbefore, as well as others, and that changes as to the precise arrangements, shapes, details and connections of the component parts, as well as the steps of the methods, may be made by those having ordinary skill in the art without departing from the spirit of the invention or the scope thereof as set out in the claims which follow.

What I claim as new and desire to secure by Letters Patent of the United States is:

1. A method of making a core adapted to be used in a dynamoelectric machine, the core having a plurality of laminations with each lamination respectively including a body of generally thin ferromagnetic material, an inner peripheral edge and an outer peripheral edge on the body, a plurality of openings through the body and spaced apart generally thereabout, each opening having a pair of leg parts with a pair of end portions spaced apart generally adjacent the outer peripheral edge and a common end edge opposite the end portion pair spaced generally adjacent the inner peripheral edge, a plurality of first pole sections on the body between adjacent ones of the openings and the inner and outer peripheral edges, a plurality of means on the body between the inner peripheral edge and the common edge of the openings for integrally interconnecting with the first pole sections, a plurality of second pole sections on the body between the leg part pair of the openings and extending from the outer peripheral edge generally toward the common end edge, a pair of opposite seats on the second pole sections extending into the leg part pair, and a plurality of means on the body between the outer peripheral edge and the end portion pair of the openings for bridging between the second pole sections and the ones adjacent thereto of the first pole sections, respectively, and a plurality of pairs of magnetic material elements, the method comprising the steps of:

stacking the laminations and aligning the openings with each other so as to define a plurality of corresponding slots extending through the laminations in the stack thereof, respectively;

disposing the magnetic material element pairs within the leg part pairs of the slots and engaging the magnetic material element pairs with the opposite seat pair on the second pole sections, respectively;

deforming the bridging means pairs and moving thereby the second pole sections with respect to the adjacent ones of the first pole sections so as to insure abutting engagement of the magnetic material element pairs between the second pole sections and the adjacent ones of the first pole sections, respectively;

providing in the slots a nonmagnetic hardenable material so as to at least generally fill the interstices of the slots between the magnetic material element pairs therein, the second pole sections and the adjacent ones of the first pole sections and forming a pair of opposite end rings of the hardenable material adjacent a pair of opposite ends of the lamination stack, with the hardenable material of the end rings being integral with that in the slots, respectively;

solidifying the hardenable material;

removing a part of the deformed bridging means pairs so as to disjoin the second pole sections from the adjacent ones of the first pole sections, respectively; and machining the outer peripheral edges of the laminations in the stack thereof to provide the core with a preselected outside diameter, respectively.

2. The method as set forth in claim 1 wherein the second pole sections respectively include means extending through the core for receiving the hardenable nonmagnetic material and wherein the solidifying step includes providing in the receiving means the nonmagnetic hardenable material, the coaction of the solidified hardenable nonmagnetic material in the receiving means with that between the magnetic material element sets and the remaining parts of the bridging means pairs effecting the retention of the second pale sections against displacement from the slots, respectively.

3. A method of making a dynamoelectric machine core from a stack of ferromagnetic material laminations having a plurality of slots extending therethrough so as to define a plurality of first interconnected pole sections disposed in spaced apart relation generally about a peripheral portion of the core and also a plurality of second pole sections interposed between adjacent ones of the first pole sections of the plurality thereof with a plurality of pairs of means arranged at least adjacent the peripheral portion of the core for bridging between the second pole sections and the adjacent ones of the first pole sections, respectively, the method comprising the steps of;

positioning in the slots a plurality of sets of magnetic material elements between the second pole sections and the adjacent ones the first pole sections and in spaced rotation with the bridging means pairs, respectively;

solidifying a hardenable nonmagnetic material in place at least within the slots generally between the magnetic material element sets and the bridging means pairs and between the first pole sections and the adjacent ones of the second pole sections; and removing parts of the bridging means pairs so as to disjoin the first pole sections and the second pole sections wherein the solidified hardenable nonmagnetic material not only acts to effect retention of the second pole sections against displacement from the slots but also defines a means for effecting magnetic polarity definition between the disjoined first pole sections and second pole sections, respectively.

4. A method of making a core adapted to be used in a dynamoelectric machine, the core having a plurality of slots extending therethrough and defining a plurality of first pole sections interposed between adjacent ones of a plurality of integrally interconnected second pole sections, and a plurality of sets of magnetic material elements with each magnetic material element having opposite side portions and opposite end portions, respectively, the method comprising the steps of:

wedging the magnetic material element sets into the slots with the opposite side portions of the magnetic material elements generally in abutting engagement with confronting parts of the first pole sections and the adjacent ones of the second pole sections, respectively; and providing at least within the slots a nonmagnetic hardenable material so as to at least in part fill the interstices of the slots at least generally adjacent the opposite end portions of the magnetic material element sets in the slots and assisting thereby at least in part the retention of the magnetic material element sets against displacement in the slots with respect to the first and second pole sections, respectively.

5. The method as set forth in claim 4 comprising the additional step of solidifying the hardenable material in place within the slots, respectively.

6. The method as set forth in claim 4 wherein the wedging step includes displacing at least one of the first and second pole sections with respect to the other of the first and second pole sections and insuring thereby the abutment between the opposite side portions of the magnetic material element sets and the confronting parts of the first and second pole sections, respectively.

7. The method as set forth in claim 6 wherein a plurality of pairs of means are provided on the core for bridging between the first and second pole sections, respectively, and wherein the wedging step further includes deforming at least some of the bridging means to effect the displacing and insuring step.

8. The method as set forth in claim 7 comprising the additional step of interrupting the bridging means so as to establish the first and second pole sections as discrete polar regions in the core, respectively.

9. The method as set forth in claim 8 comprising the further additional step of machining a peripheral portion of the core.

10. The method as set forth in claim 4 wherein the providing step comprises forming a pair of opposite end rings of the hardenable material adjacent a pair of opposite ends of the core.

11. The method as set forth in claim 4 wherein the providing step comprises forming a squirrel cage winding on the core including the hardenable material in the slots.

12. A method of making a core adapted to be used in a dynamoelectric machine, the core including a pair of first opposite end portions with a plurality of slots extending generally axially therebetween and defining a plurality of interconnected arcuately spaced apart first pole sections with each of the first pole sections respectively having a first peripheral portion extending between the first opposite end portions and a pair of opposite flanges at least adjacent the first peripheral portion and extending into adjacent ones of the slots, a plurality of second pole sections each having a second peripheral portion interposed between a pair of second opposite end portions thereof, a plurality of first and second bores extending generally axially through the first and second pole portions, respectively, a plurality of amortisseur winding bars, a pair of opposite end rings, and a plurality of sets of magnetic material elements, the method comprising the steps of:

inserting the bars through the first and second bores so that opposite ends of the bars extend generally axially beyond the first and second opsite end portions of the first and second pole sections, respectively;

positioning and second pole sections in the slots between adjacent ones of the first pole sections so that the first and second peripheral portions are at least generally coextensive with each other and arranging the magnetic material element sets within the slots generally in abutting engagement between the second pole sections and the adjacent ones of the first pole sections, respectively;

connecting the opposite end rings in both mechanical and electrical relation to the opposite ends of the bars with the opposite end rings arranged at least adjacent the first and second opposite end portions of the first and second pole sections, respectively;

providing in the slots a nonmagnetic hardenable material so as to at least generally fill the interstices of the slots about the magnetic material element sets therein up to at least adjacent the opposite flanges and between the opposite end rings; and solidifying the nonmagnetic hardenable material.

13. A method of making a core adapted to be used in a dynamoelectric machine, the core having a plurality of slots extending generally axially therethrough and defining a plurality of interconnected arcuately spaced apart first pole sections, a plurality of second pole sections, a plurality of first and second bores extending generally axially through the first and second pole sections, respectively, pair of end rings, a plurality of amortisseur winding bars, and a plurality of pairs of magnetic material elements, the method comprising the steps of:

arranging the bars in the first and second bores with opposite ends of the bars extending generally axially beyond the first and second pole sections, respectively;

locating the second pole sections in the slots and disposing the magnetic material element pairs between respective ones of the second pole sections and respective ones of the first pole sections adjacent thereto, respectively;

securing the end rings to the opposite ends of the bars; and providing in the slots a nonmagnetic hardenable material so as to at least generally fill the interstices of the slots generally about the magnetic material element pairs therein and between the end rings.

14. A method of making a core adapted to be used in a dynamoelectric machine with the core having a plurality of slot means extending therethrough for defining at least in part a plurality of first pole sections in spaced apart relation generally adjacent a peripheral portion of the core, a plurality of second pole sections interposed between adjacent ones of the first pole sections, a plurality of pairs of means at least adjacent the peripheral portion of the core for bridging between the second pole sections and the adjacent ones of the first pole sections, and a plurality of sets of magnetic material elements, the method comprising the steps of:

arranging in the slot means the magnetic material element sets between the second pole sections and the adjacent ones of the first pole sections, respectively; and deforming the bridging means and displacing thereby at least one of the second pole sections and the adjacent ones of the first pole sections with respect to the other of the second pole sections and the adjacent ones of the first pole sections so as to insure abutting engagement therebetween of the magnetic material element sets, respectively.

15. The method as set forth in claim 14 comprising the additional step of providing at least in the slot means a nonmagnetic hardenable material so as to at least generally fill the interstices therein between the second pole sections, the adjacent ones of the first pole sections, the magnetic material element sets and the bridging means and solidifying the hardenable material in place at least within the slot means.

16. The method as set forth in claim 15 comprising the further additional step of removing at least a part of the deformed bridging means and establishing the first and second pole sections as discrete polar regions in the core, respectively.

17. The method as set forth in claim 16 comprising the still further additional step of machining the peripheral portion of the core.

18. The method as set forth in claim 15 wherein the providing and solidifying step includes forming a pair of opposite end rings of the hardenable material adjacent a pair of opposite end portions of the core with the hardenable material of the opposite end rings being at least in part integral with that in the slot means, respectively.

19. The method as set forth in claim 18 wherein at least some of at least one of the first and second pole sections have at least one opening extending therethrough between the opposite end portions of the core and wherein the forming step includes filling at least generally the at least one opening with the hardenable material and with the hardenable material in the at least one opening being integral with at least a part of the hardenable material of the opposite end rings, respectively.

20. A method of making a core adapted to be used in a dynamoelectric machine, the core having a plurality of first interconnected pole sections arranged so as to extend generally in spaced apart relation about a peripheral portion of the core, the method comprising the steps of:

positioning a plurality of second pole sections in preselected positions spaced between adjacent ones of the first pole sections and abutting a plurality of sets of magnetic material elements between the first and second pole sections, respectively; and solidifying a hardenable nonmagnetic material in place in the core between the first and second pole sections and the magnetic material element sets so as not only to effect magnetic polarity definition between the first and second pole sections but also to at least in part retain the second pole sections against displacement from the preselected position thereof, respectively.

21. A method of making a core adapted to be used in a dynamoelectric machine, the core having at least one slot intersecting with a peripheral portion of the core and defining thereon a pair of interconnected discrete first polar sections, a second discrete polar section disposed in a preselected position in the at least one slot between the first pole section pair, and a set of magnetic material elements, the method comprising the steps of:

seating the magnetic material element set with a pair of opposite seats therefor on the second discrete polar section with the opposite seat pair being spaced from a pair of opposed flanges on the first discrete polar section pair extending into the at least one slot; and providing a nonmagnetic hardenable material within the at least one slot generally filling the interstices therein generally between the first discrete polar section pair, the second discrete polar section and the magnetic material element set thereby to magnetically define the second discrete polar section from the first discrete polar section pair and with parts of the hardenable material extending between the opposed flange means pair and the magnetic material element set seated on the opposite seat pair of the discrete second polar section thereby to cage it against displacement from the at least one slot.

22. A method of making a core adapted to be used in a dynamoelectric machine, the core having a plurality of slots extending therethrough and defining a plurality of first pole sections interposed between adjacent ones of a plurality of integrally interconnected second pole sections, respectively, the method comprising the steps of:

- locating a plurality of sets of magnetic material elements within the slots generally between the first pole sections and the adjacent ones of the second pole sections, respectively;
- displacing at least one of the first and second pole sections with respect to the other of the first and second pole sections and abutting the magnetic material element sets at least in part between the first and second pole sets, respectively; and
- providing at least within the slots a nonmagnetic hardenable material so as to at least in part fill the interstices of the slots generally about the magnetic material element sets in the slots, respectively.

23. The method as set forth in claim 22 wherein a plurality of pairs of means are provided on the core for bridging between the first and second pole sections, respectively, and wherein the displacing and abutting step includes deforming at least some of the bridging means.

24. The method as set forth in claim 23 comprising the additional step of interrupting the bridging means so as to establish the first and second pole sections as discrete polar regions in the core, respectively.

25. The method as set forth in claim 24 comprising the further additional step of machining a peripheral portion of the core.

26. The method as set forth in claim 22 wherein the providing step comprises forming a pair of opposite end rings of the hardenable material adjacent a pair of opposite end portions of the core.

27. The method as set forth in claim 22 wherein the providing step comprises forming a squirrel cage winding on the core including the hardenable material in the slots.

28. A method of making a core adapted to be used in a dynamoelectric machine, the core having a plurality of slots extending therethrough and defining a plurality of first pole sections interposed between adjacent ones of a plurality of second pole sections with a pair of opposed flanges on the adjacent ones of the second pole sections extending in part into the slots, respectively, and a plurality of sets of magnetic material elements, the method comprising the steps of:

- wedging the magnetic material element sets into abutting engagement between confronting parts of the first pole sections and the adjacent ones of the second pole sections within the slots, respectively; and
- providing a hardenable nonmagnetic material in the slots at least in part between the magnetic material element sets and the opposed flange pairs on the adjacent ones of the second pole sections and retaining thereby at least one of the magnetic material element sets and the first pole sections against displacement from the slots, respectively.

29. The method as set forth in claim 28 wherein the first pole sections include a pair of opposite seats and wherein the wedging step includes seating the magnetic material element sets on the opposite seat pair, respectively.

30. The method as set forth in claim 28 wherein the first pole sections include means for receiving the hardenable nonmagnetic material and wherein the providing and retaining step includes disposing the hardenable nonmagnetic material within the receiving means therefor in the first pole sections so as to retain the first pole sections against displacement from the slots, respectively.

31. A method of making a core adapted to be used in a dynamoelectric machine, the core having a plurality of slots extending therethrough and defining a plurality of first pole sections interposed between adjacent ones of a plurality of second pole sections and with a plurality of means for bridging between the first and second pole sections, respectively, and a plurality of sets of magnetic material elements, the method comprising the steps of:

- disposing the magnetic material element sets within the slots between the first pole sections and the adjacent ones of the second pole sections, respectively;
- deforming the bridging means at least in part and wedging thereby the magnetic material element sets into abutting engagement between the first and second pole pieces, respectively; and
- providing at least within the slots a nonmagnetic hardenable material so as to at least fill the interstices of the slots generally between the deformed bridging means and the magnetic material element sets, respectively.

32. The method as set forth in claim 31 comprising the additional step of removing a part of the deformed bridging means so as to disjoin the first pole sections from the adjacent ones of the second pole sections, respectively.

33. The method as set forth in claim 31 wherein the first pole sections include a pair of opposite means for seating the magnetic material element sets, respectively, and wherein the disposing step includes abutting the magnetic material element sets against the opposite seating means therefor on the first pole sections, respectively.

34. The method as set forth in claim 31 wherein the first pole sections include means extending therethrough for gripping engagement with the nonmagnetic hardenable material, respectively, and wherein the providing step includes filling with the nonmagnetic hardenable material at least in part the gripping engagement means provided therefor in the first pole sections and retaining thereby at least in part the first pole sections against displacement from the slots upon the removal of the part of the deformed bridging means.

35. A method of making a core adapted to be used in a dynamoelectric machine, the core having a plurality of sets of magnetic material elements; a pair of end rings of a nonmagnetic material, a plurality of amortisseur winding bars of a nonmagnetic material; a plurality of first laminations each including a first body of generally thin ferromagnetic material having a plurality of first outer peripheral edges and an inner peripheral edge, and a plurality of generally arcuately spaced apart openings through the first body with each of the openings having a pair of opposed side edges with an end edge connected therebetween and spaced generally adjacent the inner peripheral edge, a plurality of first pole sections on the first body between adjacent ones of the openings and between the first outer peripheral edges and the inner peripheral edge, a pair of opposite flanges integral with each on the first pole sections and connected between the opposed side edges of the openings and the first outer peripheral edges, a plurality of means on the first body between the inner peripheral edge and the end edges of the openings for integrally interconnecting between adjacent ones of the first pole sections, and a plurality of first apertures through the first body in each of the first pole sections; and a plurality of second laminations each including a second body of generally thin ferromagnetic material having a pair of opposite side edges connected between a generally arcuate edge and a free end edge opposite thereto, and a plurality of second apertures through the second body, the method comprising the steps of:

stacking the first laminations into a first stack thereof having a preselected length with the first pole sections, the outer peripheral edges, the openings and the first apertures arranged generally in axial alignment between a pair of first opposite end faces of the first stack so that the opposed side edges and end edges of the openings define corresponding opposite sidewalls and end walls of a plurality of slots interposed between the first pole sections with the opposite flanges thereof defining corresponding abutments extending into the slots and so that the first apertures define a plurality of first bores extending through the first pole sections, respectively;

inserting some of the bars into the first bores in the first stack and extending the opposite end portions of the some bars generally beyond the first opposite end faces of the first stack, respectively;

arranging the second laminations into a plurality of second stacks thereof each having generally the same preselected length as the first stack so that the opposite side edges, the arcuate edges, and the free end edges define corresponding walls and the second apertures define corresponding second bores between a pair of second opposite end faces of the second stacks which comprise second pole sections of the core, respectively;

placing the remaining bars into the second bores of the second pole sections and extending the opposite end portions of the remaining bars generally beyond the second opposite end faces of the second pole sections, respectively;

disposing the second pole sections and the magnetic material element sets in the slots of the first stack with the magnetic material element sets abutted between the opposite side walls of the second pole sections and the opposed sidewalls of the slots on adjacent ones of the first pole sections and positioning the second pole sections so that the second opposite end faces and the arcuate wall thereof are generally coextensive with the first opposite end faces and the aligned peripheral edges of the first stack, respectively;

abutting the end rings with the first opposite end faces of the first stack and the second opposite end faces of the second pole sections and connecting the end rings in both mechanical and electrical relation to the opposite end portions of the some bars and the remaining bars, respectively;

providing in the slots a nonmagnetic hardenable material so as to fill the interstices of the slots generally about the magnetic material element sets therein at least up to the opposite abutments on the first pole sections and between the end rings, respectively;

solidifying the hardenable material in the slots; and machining the aligned outer peripheral edges on the first pole sections of the first stack and the arcuate walls of the second pole sections to provide the core with a preselected outside diameter.

* * * * *